United States Patent
Wu

(10) Patent No.: US 12,490,303 B2
(45) Date of Patent: Dec. 2, 2025

(54) WIRELESS COMMUNICATION METHOD, AND TERMINAL DEVICE AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 487 days.

(21) Appl. No.: 18/088,532

(22) Filed: Dec. 24, 2022

(65) Prior Publication Data

US 2023/0209598 A1 Jun. 29, 2023

Related U.S. Application Data

(63) Continuation of application No. PCT/CN2020/123428, filed on Oct. 23, 2020.

(51) Int. Cl.
*H04W 74/0808* (2024.01)
*H04W 16/14* (2009.01)
*H04W 72/232* (2023.01)

(52) U.S. Cl.
CPC ....... *H04W 74/0808* (2013.01); *H04W 16/14* (2013.01); *H04W 72/232* (2023.01)

(58) Field of Classification Search
None
See application file for complete search history.

(56) References Cited

U.S. PATENT DOCUMENTS

| 2019/0335456 A1 | 10/2019 | Yerramalli et al. |
| 2020/0037354 A1 | 1/2020 | Li et al. |

(Continued)

FOREIGN PATENT DOCUMENTS

| CN | 110855401 A | 2/2020 |
| CN | 111107637 A | 5/2020 |

OTHER PUBLICATIONS

International Search Report and Written Opinion dated Jul. 14, 2021 in International Application No. PCT/CN2020/123428. English translation attached.

(Continued)

*Primary Examiner* — Clemence S Han
(74) *Attorney, Agent, or Firm* — Sheppard, Mullin, Richter & Hampton LLP

(57) ABSTRACT

Embodiments of the present disclosure provide a wireless communication method, a terminal device, and a network device. The method includes: determining, by a terminal device, first periodic channel occupancy, the first periodic channel occupancy including channel occupancy for the terminal device to initiate Channel Occupancy Time (COT), and the first periodic channel occupancy including first channel occupancy; and determining, by the terminal device, a channel access mode corresponding to a first uplink transmission, a start position of the first channel occupancy being same as a start position of a first time domain resource being a resource used by the terminal device for transmitting the first uplink transmission. By determining the channel access mode corresponding to the first uplink transmission, the COT initiated by the network device and the COT initiated by the terminal device can properly coexist on an unlicensed spectrum, such that system performance can be improved.

8 Claims, 3 Drawing Sheets

(56) References Cited

U.S. PATENT DOCUMENTS

| | | | | |
|---|---|---|---|---|
| 2020/0305191 A1* | 9/2020 | Moon | ................... | H04W 72/23 |
| 2021/0194740 A1* | 6/2021 | Aldana | ................. | H04W 16/14 |
| 2022/0132569 A1* | 4/2022 | Salah | ............... | H04W 74/0808 |
| 2023/0319885 A1* | 10/2023 | Bagheri | ................. | H04L 1/189 |
| | | | | 370/329 |

OTHER PUBLICATIONS

VIVO. "Discussion on the channel access procedures", R1-1912012, 3GPP TSG RAN WG1#99, Nov. 22, 2019 (Nov. 22, 2019), sections 1-2.

OPPO. "Channel access procedures for NR-U", R1-1912506, 3GPP TSG RAN WG1#99, Nov. 22, 2019 (Nov. 22, 2019Nov. 22, ), sections 1-4.

VIVO. "Discussion on the channel access procedures", R1-1910204, 3GPP TSG RAN WG1#98bis, Oct. 20, 2019 (Oct. 20, 2019), sections 1-2.

Nokia, Nokia Shanghai Bell. "Revised WID: Enhanced Industrial Internet of Things (IoT) and ultra-reliable and low latency communication (URLLC) support for NR", 3GPP TSG RAN Meeting #88e RP-201310, Jul. 3, 2020 (Jul. 3, 2020), section "4 Objective".

Extended European Search Report dated Nov. 20, 2023 received in European Patent Application No. EP20958367.3.

Huawei et al:"Coexistence and channel access for NR unlicensed band operations"3GPP Draft; R1-1911866, 3rd Generation Partnership Project (3GPP), Mobile Competence Centre : 650, Route Des Lucioles ; F-06921 Sophia-Antipolis Cedex, France vol. RAN WG1,No. Reno, USA;Nov. 18, 2019-Nov. 22, 2019,Nov. 9, 2019 (Nov. 9, 2019), XP051823048.

* cited by examiner

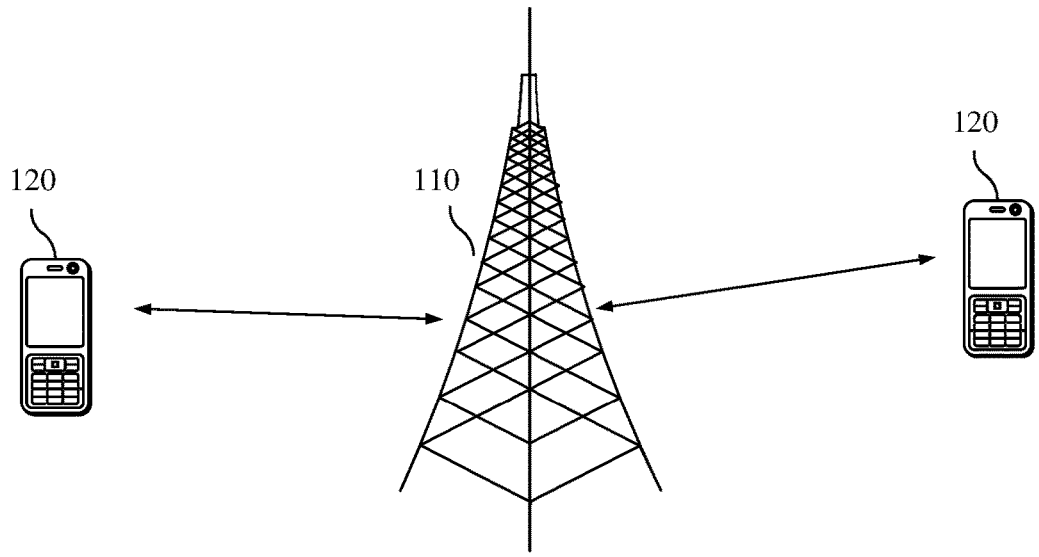

FIG. 1

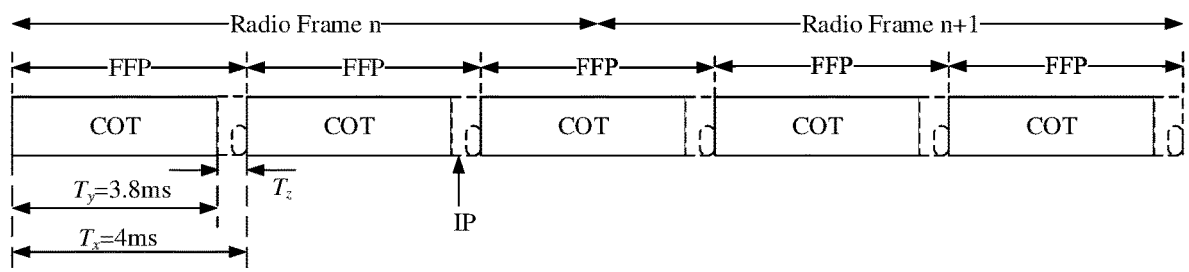

FIG. 2

```
                                                          200
┌─────────────────────────────────────────────────────┐
│ Determine, by a terminal device, first periodic     │   S210
│ channel occupancy, the first periodic channel       │
│ occupancy including channel occupancy for the       │
│ terminal device to initiate COT, and the first      │
│ periodic channel occupancy including first channel  │
│ occupancy                                           │
└─────────────────────────────────────────────────────┘
                           │
┌─────────────────────────────────────────────────────┐
│ Determine a channel access mode corresponding to    │   S220
│ a first uplink transmission, a start position of    │
│ the first channel occupancy being same as a start   │
│ position of a first time domain resource, and the   │
│ first time domain resource being a resource used    │
│ by the terminal device for transmitting the first   │
│ uplink transmission                                 │
└─────────────────────────────────────────────────────┘
```

FIG. 3

WIRELESS COMMUNICATION METHOD, AND TERMINAL DEVICE AND NETWORK DEVICE

CROSS-REFERENCE TO RELATED APPLICATIONS

This application is a continuation of International Application No. PCT/CN2020/123428 filed on Oct. 23, 2020, the entire disclosure of which is incorporated herein by reference.

TECHNICAL FIELD

The embodiments of the present disclosure relate to communication technology, and more particularly, to a wireless communication method, a terminal device, and a network device.

BACKGROUND

In a New Radio-based access to unlicensed spectrum (NR-U) system, the spectrum used is a shared spectrum. In a communication system deployed on a shared spectrum, such as the NR-U system, a Frame Based Equipment (FBE) mode is introduced to support Channel Occupancy Time (COT) initiated by a terminal device. However, in this case, how to perform signal/channel transmission to ensure proper coexistence of COT initiated by a network device and COT initiated by a terminal device on an unlicensed spectrum is a problem to be solved.

SUMMARY

The embodiments of the present disclosure provide a wireless communication method, a terminal device, and a network device, capable of achieving proper coexistence of COT initiated by a network device and COT initiated by a terminal device on an unlicensed spectrum, so as to improve system performance.

In a first aspect, a wireless communication method is provided. The method includes: determining, by a terminal device, first periodic channel occupancy, the first periodic channel occupancy including channel occupancy for the terminal device to initiate Channel Occupancy Time (COT), and the first periodic channel occupancy including first channel occupancy; and determining, by the terminal device, a channel access mode corresponding to a first uplink transmission, a start position of the first channel occupancy being same as a start position of a first time domain resource, and the first time domain resource being a resource used by the terminal device for transmitting the first uplink transmission.

In a second aspect, a wireless communication method is provided. The method includes: transmitting, by a network device, first Downlink Control Information (DCI) to a terminal device, the first DCI being used by the terminal device to determine a channel access mode corresponding to a first uplink transmission, and the first DCI being used to schedule the first uplink transmission.

In a third aspect, a terminal device is provided. The terminal device is configured to perform the method according to the above first aspect or any implementation thereof. In particular, the terminal device includes one or more functional modules configured to perform the method according to the above first aspect or any implementation thereof.

In a fourth aspect, a network device is provided. The network device is configured to perform the method according to the above second aspect or any implementation thereof. In particular, the network device includes one or more functional modules configured to perform the method according to the above second aspect or any implementation thereof.

In a fifth aspect, a terminal device is provided. The terminal device includes a processor and a memory. The memory stores a computer program, and the processor is configured to invoke and execute the computer program stored in the memory to perform the method according to the above first aspect or any implementation thereof.

In a sixth aspect, a network device is provided. The network device includes a processor and a memory. The memory stores a computer program, and the processor is configured to invoke and execute the computer program stored in the memory to perform the method according to the above second aspect or any implementation thereof.

In a seventh aspect, a chip is provided. The chip is configured to perform the method according to any of the above first to second aspects or any implementation thereof. In particular, the chip includes a processor configured to invoke and execute a computer program from a memory, to cause a device provided with the chip to perform the method according to any of the above first to second aspects or any implementation thereof.

In an eighth aspect, a computer-readable storage medium is provided. The computer-readable storage medium stores a computer program that causes a computer to perform the method according to any of the above first to second aspects or any implementation thereof.

In a ninth aspect, a computer program product is provided. The computer program product includes computer program instructions that cause a computer to perform the method according to any of the above first to second aspects or any implementation thereof.

In a tenth aspect, a computer program is provided. The computer program, when executed on a computer, causes the computer to perform the method according to any of the above first to second aspects or any implementation thereof.

With the above technical solutions, after determining the first periodic channel occupancy, the terminal device can determine the channel access mode corresponding to the first uplink transmission. That is, the terminal device can determine an LBT scheme corresponding to the first uplink transmission. For example, the UE can perform LBT by sharing COT of the network device or initiating COT, so as to avoid collision between the COT initiated by the network device and the COT initiated by the terminal device on an unlicensed spectrum. That is, the COT initiated by the network device and the COT initiated by the terminal device can properly coexist on the unlicensed spectrum, such that communication performance can be improved.

BRIEF DESCRIPTION OF THE DRAWINGS

FIG. 1 is a schematic diagram showing a communication system architecture in which an embodiment of the present disclosure can be applied.

FIG. 2 is a schematic diagram showing semi-static channel occupancy according to the present disclosure.

FIG. 3 is a schematic flowchart illustrating a wireless communication method according to an embodiment of the present disclosure.

DETAILED DESCRIPTION

Figure 4:
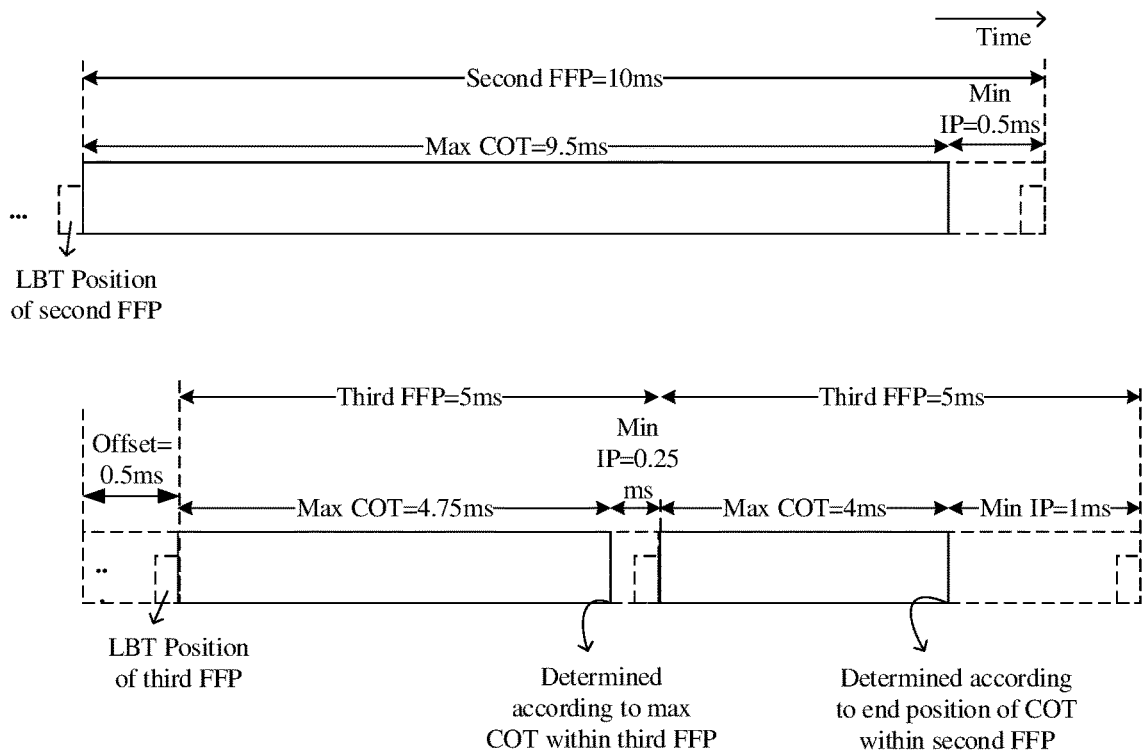
FIG. 4 to FIG. 6 are schematic timing diagrams of channel occupancy according to embodiments of the present disclosure.

The technical solutions in the embodiments of the present disclosure will be described below with reference to the figures. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The solutions according to the embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Non-Terrestrial Network (NTN) system, Universal Mobile Telecommunication System (UMTS), Wireless Local Area Networks (WLAN), Wireless Fidelity (WiFi), the $5^{th}$ Generation (5G) system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, Vehicle to everything (V2X) communication, etc. The embodiments of the present disclosure can also be applied to these communication systems.

In at least one embodiment, the communication system of an embodiment of the present disclosure may be applied to a Carrier Aggregation (CA) scenario, a Dual Connectivity (DC) scenario, a Standalone (SA) network deployment scenario, and the like.

In at least one embodiment, the communication system of an embodiment of the present disclosure may be applied to unlicensed spectrum or shared spectrum. Alternatively, the communication system of an embodiment of the present disclosure may be applied to licensed spectrum or non-shared spectrum.

The embodiments of the present disclosure are described in conjunction with a network device and a terminal device. The terminal device may refer to a User Equipment (UE), an access terminal, a user unit, a user station, a mobile station, a remote station, a remote terminal, a mobile device, a user terminal, a terminal, a wireless communication device, a user agent, or a user device.

The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

In the embodiments of the present disclosure, the terminal device can be deployed on land, including indoor or outdoor, handheld, worn, or vehicle-mounted, deployed on water (e.g., on a ship), or deployed in the air (e.g., on an airplane, a balloon, a satellite, etc.).

In the embodiments of the present disclosure, the terminal device may be a mobile phone, a tablet computer (Pad), a computer with a wireless transceiver function, a Virtual Reality (VR) terminal device, an Augmented Reality (AR) terminal device, a wireless terminal in industrial control, a wireless terminal device in self driving, a wireless terminal device in remote medical, a wireless terminal device in smart grid, a wireless terminal device in transportation safety, a wireless terminal device in smart city, or a wireless terminal device in smart home.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

In an embodiment of the present disclosure, the network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, a network device in a future evolved PLMN, or a network device in an NTN.

As a non-limiting example, in an embodiment of the present disclosure, the network device may have mobile characteristics, e.g., the network device may be a mobile device. In at least one embodiment, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. In at least one embodiment, the network device may also be a base station provided in a location such as land or water.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Exemplarily, a communication system 100 in which an embodiment of the present disclosure can be applied is schematically shown in FIG. 1. The communication system 100 may include a network device 110 which may be a device communicating with a terminal device 120 (or referred to as communication terminal or terminal). The network device 110 may provide communication coverage for a particular geographic area, and may communicate with terminal devices located within the coverage.

FIG. 1 exemplarily shows one network device and two terminal devices. In at least one embodiment, the communication system 100 may include multiple network devices, and the coverage of each network device may include other numbers of terminal devices. The embodiment of the present disclosure is not limited to this.

In at least one embodiment, the communication system 1000 1 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal device 120 with communication functions. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The terms used in the embodiments of the present disclosure are provided only for explaining the specific embodiments of the present disclosure, rather than limiting the present disclosure. The terms such as "first", "second", "third", "fourth", etc., as used in the description, claims and figures of the present disclosure are used for distinguishing different objects from each other, rather than defining a specific order. In addition, the terms such as "include" and "have" and any variants thereof are intended to cover non-exclusive inclusion.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

In at least one embodiment, in an embodiment of the present disclosure, indication information or configuration information may include physical layer signaling such as at least one of Downlink Control Information (DCI), System Information (SI), Radio Resource Control (RRC) signaling, or Media Access Control Control Element (MAC CE).

In at least one embodiment, in an embodiment of the present disclosure, a high-layer parameter or high-layer signaling may include at least one of Radio Resource Control (RRC) signaling or Media Access Control Control Element (MAC CE).

In at least one embodiment, in an embodiment of the present disclosure, "predetermined" can be achieved by pre-saving corresponding codes, tables or other means that can be used to indicate relevant information in devices (for example, including terminal devices and network devices). The present disclosure is not limited to any of these specific implementations. For example, "predetermined" may refer to defined in a protocol.

In at least one embodiment, in an embodiment of the present disclosure, the term "protocol" may refer to a standard protocol in the field of communication. For example, it may include the LTE protocol, the NR protocol, and any other related protocols applied to future communication systems, and the present disclosure is not limited to any of these examples.

The unlicensed spectrum is the spectrum allocated by the country and region that can be used for radio device communication. This spectrum is usually considered a shared spectrum, that is, communication devices in different communication systems can use this spectrum as long as they meet regulatory requirements set by the country or region on the spectrum, without having to apply for exclusive spectrum authorization from the government.

In order to allow various communication systems that use the unlicensed spectrum (also called shared spectrum) for wireless communication to coexist friendly on this spectrum, some countries or regions have specified regulatory requirements that must be met when using the unlicensed spectrum. For example, the communication device follows the principle of "Listen Before Talk (LBT)", that is, before the communication device transmits a signal on a channel on the unlicensed spectrum, it needs to perform channel listening (also called channel sensing) first. Only when the channel sensing result shows that the channel is idle, the communication device can transmit the signal. If the channel sensing result of the communication device on the channel of the unlicensed spectrum shows that the channel is busy, the communication device cannot transmit the signal. In order to ensure fairness, in one transmission, the time length for the communication device to perform signal transmission using the channel on the unlicensed spectrum cannot exceed Maximum Channel Occupancy Time (MCOT).

On the unlicensed spectrum, a network device needs to perform LBT before transmitting downlink channels or downlink signals. Only when the LBT succeeds, the network device can perform the transmission, and no transmission can be performed in case of LBT failure. Therefore, communications on unlicensed spectrum are opportunistic transmissions. From the perspective of network deployment of the system, channel sensing includes two mechanisms: one is Load Based Equipment (LBE) LBT, also known as dynamic channel sensing, dynamic channel access, or dynamic channel occupancy, and the other is Frame Based Equipment (FBE) LBT, also known as semi-static channel sensing, semi-static channel access, semi-static channel occupancy, or periodic channel occupancy.

In the FBE channel access mechanism, or semi-static channel access mode, the frame structure occurs periodically, that is, channel resources the communication device can use for service transmission occur periodically. A frame structure includes a Fixed Frame Period (FFP), Channel Occupancy Time (COT), and an Idle Period (IP). Here, the length value range of the FFP can be for example 1 to 10 ms, the length of the COT does not exceed 95% of the length of the FFP, the length of the IP is at least 5% of the length of the FFP and the minimum value of the IP is 100 μs and is at the end of the FFP.

The communication device performs channel sensing on the channel during the idle period to evaluate the availability of the channel (sensing for evaluating a channel availability, also known as Clear Channel Assessment (CCA)). If the channel sensing succeeds, the Channel Occupancy Time (COT) in the next FFP can be used for signal transmission. If the channel sensing fails, the COT in the next FFP cannot be used for signal transmission.

Currently in the NR-U system, only the COT initiated by the network device is supported in the FBE mode. The semi-static channel access mode may be indicated by the base station via System Information Block (SIB) 1 or configured via a high-layer parameter.

FIG. 2 is a schematic diagram showing semi-static channel occupancy according to the present disclosure.

As shown in FIG. 2, the length of the Fixed Frame Period (FFP) is $T_x$, which can be configured by the base station. The value range of $T_x$ can include, for example: 1, 2, 2.5, 4, 5, 10, in units of milliseconds. Here, starting from every two consecutive radio frames, in every two consecutive radio frames, the start position of the FFP can be determined according to $x \cdot T_x$, where $x \in \{0, 1, \ldots, 20/T_x - 1\}$, the maximum COT length in FFP can be $T_y = 0.95\, T_x$, and the IP length in the FFP can be at least $T_z = \max(0.05 \cdot T_x, 100\ \mu s)$.

If a serving cell is configured in the semi-static channel access mode, then the periodic channel occupancy length (or channel occupancy period) of the serving cell is $T_x$, and the maximum channel occupancy length included in the periodic channel occupancy length of the serving cell is $T_y$, the length of the idle period included in the periodic channel occupancy length of the serving cell is $T_z$. The terminal device can determine $T_y$ and/or $T_z$ according to the configured $T_x$. For example, as described above, after the terminal device determines the length $T_x$ of the FFP, it can determine information such as the start position of the FFP, the period of the FFP, the maximum COT length for signal transmission in the FFP, and the idle period for channel sensing in the FFP according to predetermined rules.

In the FBE-based NR-U system, when the UE is scheduled to perform uplink transmission in the FFP of the base station, the UE can perform transmission by sharing COT of the network device.

The scheme for sharing COT of the network device will be introduced below.

After the UE detects a downlink transmission burst transmitted by the base station in the COT, the UE may share a resource in the COT of the base station to transmit the uplink transmission burst. In this case, the UE's channel sensing scheme may include:

1. If the gap between the uplink transmission burst and the downlink transmission burst does not exceed 16 microseconds, the UE can start to transmit the uplink transmission burst without performing channel sensing after the downlink transmission burst ends.

2. If the gap between the uplink transmission burst and the downlink transmission burst exceeds 16 microseconds, the UE can perform channel sensing with a detection time slot length of 9 microseconds within the interval of 25 microseconds before the start of the uplink transmission burst, and transmit the uplink transmission burst after the channel sensing succeeds.

Specifically, in the FBE mode, when a terminal device is scheduled for PUSCH or PUCCH transmission, a network device can indicate a channel access mode corresponding to the PUSCH or PUCCH and a size of a Cyclic Prefix Extension (CPE) for the UE's transmission via channel access indication information in Downlink Control Information (DCI) carrying an uplink grant (UL grant) or downlink grant (DL grant).

In some embodiments of the present disclosure, the Downlink Control Information (DCI) carrying the uplink grant (UL grant) or downlink grant (DL grant) may include the following types:

Non-fallback uplink grant for scheduling PUSCH transmission (e.g., DCI format 01):

In at least one embodiment, a high-level parameter configures a first indication set, and the first indication set includes at least one jointly coded channel access type, CPE length, and CAPC.

In at least one embodiment, the non-fallback uplink grant includes channel access indication information, and the channel access indication information is used to determine the jointly coded channel access type, CPE length and CAPC from the first indication set.

In at least one embodiment, the channel access type, CPE length and CAPC can be used for PUSCH transmission.

In at least one embodiment, in this case, the channel access indication information includes at most 6 bits.

Non-fallback downlink grant for scheduling PDSCH transmission (e.g., DCI format 1_1):

In at least one embodiment, a high layer parameter configures a second indication set, and the second indication set includes at least one jointly coded channel access type and CPE length.

In at least one embodiment, the non-fallback downlink grant includes channel access indication information, and the channel access indication information is used to determine the jointly coded channel access type and CPE length from the second indication set.

In at least one embodiment, the channel access type and CPE length can be used for PUCCH transmission, and the PUCCH can carry HARQ-ACK information corresponding to the PDSCH scheduled by the non-fallback downlink grant. In at least one embodiment, CAPC=1.

In at least one embodiment, in this case, the channel access indication information includes at most 4 bits.

Fallback uplink grant for scheduling PUSCH transmission (e.g., DCI format 0_0):

In at least one embodiment, the fallback uplink grant includes channel access indication information, and the channel access indication information is used to determine the jointly coded channel access type and CPE length from a third indication set.

In at least one embodiment, the third indication set is predetermined, as shown in Table 1 and Table 2 below.

In at least one embodiment, the channel access type and CPE length can be used for PUSCH transmission. In at least one embodiment, the terminal device selects the CAPC autonomously according to the service priority.

In at least one embodiment, in this case, the channel access indication information includes 2 bits.

Fallback downlink grant for scheduling PDSCH transmission (e.g., DCI format 10):

In at least one embodiment, the fallback downlink grant includes channel access indication information, and the channel access indication information is used to determine the jointly coded channel access type and CPE length from the third indication set.

In at least one embodiment, the third indication set is predetermined, as shown in Table 1 and Table 2 below.

In at least one embodiment, the channel access type and CPE length can be used for PUCCH transmission, and the PUCCH can carry HARQ-ACK information corresponding to the PDSCH scheduled by the fallback downlink grant. In at least one embodiment, CAPC=1.

In at least one embodiment, in this case, the channel access indication information includes 2 bits.

TABLE 1

Third Indication Set

| Channel Access Indication Information | Channel Access Type | CPE Length |
|---|---|---|
| 0 | Type 2C | 2 |
| 1 | Type 2A | 3 |
| 2 | Type 2A | 1 |
| 3 | Type 1 | 0 |

As shown in Table 1, if the channel access indication information indicates 0, the channel access type is Type 2C, and the CPE length is determined according to the CPE length corresponding to 2 in Table 2, that is, the CPE length is determined according to C2 and 16 microseconds+$T_{TA}$. In at least one embodiment, the determination of the CPE length according to Table 2 includes: CPE length=$C_i$*symbol length-$\Delta i$. As an example, in this case the CPE length is C2*symbol length-16 microseconds-$T_{TA}$. In this case it can be considered that the CPE length corresponds to 16 microseconds.

TABLE 2

| CPE Parameters | | |
|---|---|---|
| CPE Length | Ci | Δi |
| 0 | — | — |
| 1 | C1 | 25 microseconds |
| 2 | C2 | 16 microseconds + $T_{TA}$ |
| 3 | C3 | 25 microseconds + $T_{TA}$ |

Here, the values of C2 and C3 are configured by high-level parameters, and the value of C1 is predetermined, C1=1 for $\mu \in \{0, 1\}$, C1=2 for $\mu=2$. Here, $\mu$ represents the subcarrier spacing configuration, and y=0, 1, and 2 represent 15 kHz, 30 kHz, and 60 kHz, respectively.

As an example, in a system based on the FBE mode, if a terminal device receives channel access indication information indicating Type 2A channel access or channel access indication information indicating Type 1 channel access, the channel sensing scheme of the terminal device is as follows: the terminal device performs channel sensing with a detection time slot length of 9 microseconds in an interval of a length of 25 microseconds before the start of the uplink transmission burst.

With the evolution of the system, the terminal device is also allowed to initiate COT in the FBE mode.

For example, the channel sensing scheme for the terminal device to initiate the COT may include:

The terminal device performs channel sensing with a detection time slot length of 9 microseconds before the start of the uplink transmission burst or FFP, and starts transmitting the uplink transmission burst from the start position of the COT after the channel sensing succeeds. If the channel sensing fails, the terminal device cannot perform any uplink transmission in the current uplink transmission burst.

However, in this case, how to perform signal/channel transmission to ensure proper coexistence of the COT initiated by the network device and the COT initiated by the terminal device on the unlicensed spectrum is a problem to be solved.

For example, when the terminal device is scheduled for uplink transmission, which is located at the start position of channel occupancy (one FFP) in the periodic channel occupancy (FFP configuration) configured for the terminal device to initiate channel occupancy, how the terminal device can determine the LBT mode corresponding to the uplink transmission, for example, whether the terminal device performs LBT by sharing the COT of the network device or by initiating the COT on its own is the main consideration of the present disclosure.

The present disclosure provides a wireless communication method, a terminal device, and a network device, capable of allowing the COT initiated by the network device and the COT initiated by the terminal device to properly coexist on an unlicensed spectrum, so as to improve system performance.

In order to facilitate understanding of the present disclosure, the terms used in the present disclosure will be described below.

Maximum Channel Occupancy Time (MCOT): the maximum length of time that a channel is allowed for signal transmission after successful channel sensing of the channel on a shared spectrum.

Channel Occupancy Time (COT): the length of time a channel can be used for signal transmission after successful channel sensing of the channel on a shared spectrum. It can also be considered as the length of time the channel can be occupied after successful channel sensing of the channel on the shared spectrum. Here, the channel occupied by the signal within the time length may be continuous or discontinuous, and the time length includes total time for signal transmission by the device initiating the channel occupancy and the device sharing the channel occupancy.

Channel Occupancy Time of network device (gNB/eNB-initiated COT): also known as COT initiated by network device or channel occupancy initiated by network device, channel occupancy time obtained by a network device after successful channel sensing of a channel on a shared spectrum. The COT initiated by the network device can not only be used by the network device for transmission, but can also be used by the terminal device for transmission under certain conditions.

Channel Occupancy Time of terminal device (UE-initiated COT): also known as COT initiated by terminal device or channel occupancy initiated by terminal device, channel occupancy time obtained by a terminal device after successful channel sensing of a channel on a shared spectrum. The COT initiated by the terminal device can not only be used by the terminal device for transmission, but can also be used by the network device for transmission under certain conditions.

Downlink Transmission Burst (DL Transmission Burst): a set of downlink transmissions performed by a network device (that is, including one or more downlink transmissions). The set of downlink transmissions is continuous transmissions (that is, there is no gap between the downlink transmissions), or there are gaps in between the downlink transmissions in the set but the gaps are smaller than or equal to 16 µs. If the gap between two downlink transmissions by the network device is greater than 16 µs, then the two downlink transmissions are considered as belonging to two downlink transmission bursts.

Uplink Transmission Burst (UL Transmission Burst): a set of uplink transmissions performed by a terminal device (that is, including one or more uplink transmissions). The set of uplink transmissions is continuous transmissions (that is, there is no gap between the uplink transmissions), or there are gaps in between the uplink transmissions in the set but the gaps are smaller than or equal to 16 µs. If the gap between two uplink transmissions by the terminal device is greater than 16 µs, then the two uplink transmissions are considered as belonging to two uplink transmission bursts.

Channel sensing success: also known as channel sensing idle. For example, the energy detection performed on a channel in a detection time slot is lower than an energy detection threshold.

Channel sensing failure: also known as channel sensing busy. For example, the energy detection performed on a channel in a detection time slot is higher than or equal to an energy detection threshold.

FIG. 2 shows a schematic flowchart illustrating a wireless communication method 200 according to an embodiment of the present disclosure, and the method 200 can be performed by a terminal device, e.g., the terminal device shown in FIG. 1.

As shown in FIG. 2, the method 200 may include:

At S210, a terminal device determines first periodic channel occupancy. The first periodic channel occupancy includes channel occupancy for the terminal device to initiate Channel Occupancy Time (COT). The first periodic channel occupancy includes first channel occupancy.

At S220, the terminal device determines a channel access mode corresponding to a first uplink transmission. A start position of the first channel occupancy is same as a start position of a first time domain resource. The first time domain resource is a resource used by the terminal device for transmitting the first uplink transmission.

In other words, if the terminal device is configured with the first periodic channel occupancy by a network device, the first periodic channel occupancy is used for the terminal device to initiate COT. In this case, when the terminal device is scheduled to transmit the first uplink transmission from the start position of the first channel occupancy in the first periodic channel occupancy, it needs to determine whether to perform LBT by sharing the COT of the network device or initiating the COT on its own.

With the above technical solutions, after determining the first periodic channel occupancy, the terminal device can determine the channel access mode corresponding to the first uplink transmission. That is, the terminal device can determine an LBT scheme corresponding to the first uplink transmission. For example, the UE can perform LBT by sharing COT of the network device or initiating COT, so as to avoid collision between the COT initiated by the network device and the COT initiated by the terminal device on an unlicensed spectrum. That is, the COT initiated by the network device and the COT initiated by the terminal device can properly coexist on the unlicensed spectrum, such that communication performance can be improved.

In at least one embodiment, the first periodic channel occupancy may refer to a configured periodic FFP, and the first channel occupancy may refer to an FFP in the configured periodic FFP.

In at least one embodiment, the first channel occupancy may be channel occupancy configured for the terminal device to initiate COT.

In at least one embodiment, the first channel occupancy may include a first COT and a first IP, and a start position of the first COT is same as a start position of the first time domain resource.

In at least one embodiment, the terminal device may determine second channel occupancy, the second channel occupancy may be used for the network device to initiate channel occupancy, and the second channel occupancy may include second COT and a second IP.

In at least one embodiment, the first uplink transmission may be a first uplink transmission in a first uplink transmission burst. In at least one embodiment, the first uplink transmission burst may include one or more uplink transmissions.

In some embodiments of the present disclosure, the channel access mode corresponding to the first uplink transmission may include a first channel access mode and/or a second channel access mode.

In at least one embodiment, the first channel access mode may include a channel access mode which is used to initiate a COT by the terminal device.

In at least one embodiment, the first channel access mode includes a channel access mode in which the terminal device initiates channel occupancy.

In at least one embodiment, the first channel access mode may include performing channel sensing with a fixed detection time slot length.

In at least one embodiment, the fixed detection time slot length may be 9 microseconds.

As an example, the first channel access mode may include: the terminal device performing channel sensing with a fixed detection time slot length of 9 microseconds before the first time domain resource, and when the channel sensing succeeds, the terminal device transmitting the first uplink transmission over the first time domain resource, or when the channel sensing fails, the terminal device not transmitting the first uplink transmission over the first time domain resource.

As another example, the first channel access mode may include: the terminal device performing channel sensing with a detection time slot length of 9 microseconds before the start position of the first channel occupancy, and starting to transmit the first uplink transmission burst from the start position of the first channel occupancy after the channel sensing succeeds, the first uplink transmission burst including the first uplink transmission, or if the channel sensing fails, the terminal device not performing any uplink transmission in the first channel occupancy.

As another example, the first channel access mode may include: the terminal device performing channel sensing with a detection time slot length of 9 microseconds before the start position of the first COT, and starting to transmit the first uplink transmission burst from the start position of the first COT after the channel sensing succeeds, the first uplink transmission burst including the first uplink transmission, or if the channel sensing fails, the terminal device not performing any uplink transmission in the first channel occupancy.

In at least one embodiment, when the terminal device is configured with a COT shared energy detection threshold, the terminal device may perform channel sensing using the COT shared energy detection threshold in the first channel access mode.

In at least one embodiment, the second channel access mode may include a channel access mode which is used to share a COT of a network device.

In at least one embodiment, the second channel access mode may include a first channel access sub-mode and/or a second channel access sub-mode. The first channel access sub-mode includes performing no channel sensing, and the second channel access sub-mode includes performing channel sensing with a fixed detection time slot length within a fixed interval.

In at least one embodiment, the fixed detection time slot length may be 9 microseconds.

In at least one embodiment, the fixed interval may have a length of 25 microseconds.

As an example, the first channel access sub-mode may include: when a gap between the first uplink transmission and a first downlink transmission burst does not exceed 16 microseconds, the terminal device starting to transmit the first uplink transmission without performing channel sensing after the first downlink transmission burst ends. As an example, the second channel access sub-mode may include: when the gap between the first uplink transmission and the first downlink transmission burst exceeds 16 microseconds, the terminal device performing channel sensing with a fixed detection time slot length of 9 microseconds within a fixed interval of 25 microseconds before starting the first uplink transmission, and transmitting the first uplink transmission after the channel sensing succeeds. Here, the first uplink transmission and the first downlink transmission burst belong to same COT of the network device.

It should be noted that, in the embodiment of the present disclosure, the first COT and the COT initiated by the terminal device may overlap completely or partially, and the present disclosure is not limited to any of these.

In at least one embodiment, the first time domain resource may be a resource used by the terminal device to transmit the first uplink transmission, and the first time domain resource may be a resource scheduled by the network device via first DCI for the first uplink transmission.

In at least one embodiment, the first time domain resource may be a resource used by the terminal device to transmit the first uplink transmission, and the first time domain resource may be a resource preconfigured by the network device for the first uplink transmission.

In some embodiments of the present disclosure, S220 may include:

the terminal device determining the channel access mode corresponding to the first uplink transmission according to first Downlink Control Information (DCI) used for scheduling the first uplink transmission.

In at least one embodiment, the terminal device may determine the channel access mode corresponding to the first uplink transmission according to channel access indication information in the first DCI.

In at least one embodiment, the channel access indication information may indicate a Cyclic Prefix Extension (CPE) length. The terminal device may determine that the channel access mode corresponding to the first uplink transmission is the first channel access mode when the CPE length indicated by the channel access indication information is a first predetermined value or corresponds to the first predetermined value, or the terminal device may determine that the channel access mode corresponding to the first uplink transmission is the second channel access mode when the CPE length indicated by the channel access indication information is not the first predetermined value or does not correspond to the first predetermined value.

In at least one embodiment, the first predetermined value may be 0.

As an example, when the CPE length indicated by the channel access indication information is 0, the terminal device may determine that the channel access mode corresponding to the first uplink transmission is the first channel access mode; or when the CPE length indicated by the channel access indication information is not 0, the terminal device may determine that the channel access mode corresponding to the first uplink transmission is the second channel access mode.

In at least one embodiment, the first predetermined value may be 25 microseconds.

As an example, when the CPE length indicated by the channel access indication information corresponds to 25 microseconds, the terminal device may determine that the channel access mode corresponding to the first uplink transmission is the first channel access mode; or when the CPE length indicated by the channel access indication information does not correspond to 25 microseconds, the terminal device may determine that the channel access mode corresponding to the first uplink transmission is the second channel access mode.

In at least one embodiment, the channel access indication information may further indicate a channel access type, and when the CPE length indicated by the channel access indication information is not the first predetermined value or does not correspond to the first predetermined value: the terminal device may determine that the channel access mode corresponding to the first uplink transmission is a first channel access sub-mode in the second channel access mode when the channel access type indicated by the channel access indication information is Type 2C or Type 2B, or the terminal device may determine that the channel access mode corresponding to the first uplink transmission is a second channel access sub-mode in the second channel access mode when the channel access type indicated by the channel access indication information is Type 2A or Type 1.

In at least one embodiment, the first predetermined value may be 0.

As an example, the terminal device may determine that the channel access mode corresponding to the first uplink transmission is the first channel access mode when the channel access indication information received by the terminal device indicates "3" in Table 1 (the CPE length indication is 0), or the terminal device may determine that the channel access mode corresponding to the first uplink transmission is the second channel access mode when the channel access indication information received by the terminal device indicates "0", "1", or "2" in Table 1 (the CPE length indication is not 0). Further, the terminal device may determine that the channel access mode corresponding to the first uplink transmission is the first channel access sub-mode when the channel access indication information received by the terminal device indicates "0" in Table 1; or the terminal device may determine that the channel access mode corresponding to the first uplink transmission is the second channel access sub-mode when the channel access indication information received by the terminal device indicates "1" or "2" in Table 1.

In at least one embodiment, the first predetermined value may be 25 microseconds.

As an example, the terminal device may determine that the channel access mode corresponding to the first uplink transmission is the first channel access mode when the channel access indication information received by the terminal device indicates "1" or "2" in Table 1 (the CPE length indication corresponds to 25 microseconds); or the terminal device may determine that the channel access mode corresponding to the first uplink transmission is the second channel access mode when the channel access indication information received by the terminal device indicates "0" or "3" in Table 1 (the CPE length indication does not correspond to 25 microseconds). Further, the terminal device may determine that the channel access mode corresponding to the first uplink transmission is the first channel access sub-mode when the channel access indication information received by the terminal device indicates "0" in Table 1; or the terminal device may determine that the channel access mode corresponding to the first uplink transmission is the second channel access sub-mode when the channel access indication information received by the terminal device indicates "3" in Table 1.

In at least one embodiment, when the start position of the first time domain resource is different from the start position of the first COT (or the start position of the first time domain resource is different from the start position of the first channel occupancy), the terminal device may not expect the CPE length indicated by the channel access indication information to be 0. Alternatively, when the start position of the first time domain resource is different from the start position of the first COT (or, the start position of the first time domain resource is different from the start position of the first channel occupancy), the terminal device may determine that the first uplink transmission corresponds to the second channel access mode, or in other words, the terminal device may not determine the channel access mode according to the CPE length indicated by the channel access indication information.

In at least one embodiment, the channel access indication information may indicate a channel access type, and the terminal device may determine that the channel access mode corresponding to the first uplink transmission is the first channel access mode when the channel access type indicated by the channel access indication information is a first type, or the terminal device may determine that the channel access mode corresponding to the first uplink transmission is the second channel access mode when the channel access type indicated by the channel access indication information is not the first type.

In at least one embodiment, the channel access indication information may further indicate a CPE length. When the channel access type indicated by the channel access indication information is not the first type, the terminal device may determine that the channel access mode corresponding to the first uplink transmission is a first channel access sub-mode in the second channel access mode when the CPE length indicated by the channel access indication information corresponds to 16 microseconds, or the terminal device may determine that the channel access mode corresponding to the first uplink transmission is a second channel access sub-mode in the second channel access mode when the CPE length indicated by the channel access indication information does not correspond to 16 microseconds.

In at least one embodiment, the first type may include at least one of: Type 2A, Type 2B, Type 2C, or Type 1.

In at least one embodiment, the terminal device may determine that the channel access mode corresponding to the first uplink transmission is the first channel access mode when the channel access type indicated by the channel access indication information is Type 1 channel access; or the terminal device may determine that the channel access mode corresponding to the first uplink transmission is the second channel access mode when the channel access type indicated by the channel access indication information is not Type1 channel access.

As an example, the terminal device may determine that the channel access mode corresponding to the first uplink transmission is the first channel access mode when the channel access indication information received by the terminal device indicates "3" (Type 1 channel access) in Table 1, or the terminal device may determine that the channel access mode corresponding to the first uplink transmission is the second channel access mode when the channel access indication information received by the terminal device indicates "0", "1" or "2" (non-Type 1 channel access) in Table 1. Further, the terminal device may determine that the channel access mode corresponding to the first uplink transmission is the first channel access sub-mode when the channel access indication information received by the terminal device indicates "0" (Type 2C channel access) in Table 1; or the terminal device may determine that the channel access mode corresponding to the first uplink transmission is the second channel access sub-mode when the channel access indication information received by the terminal device indicates "1" or "2" (Type 2A channel access) in Table 1.

In at least one embodiment, the terminal device may determine that the channel access mode corresponding to the first uplink transmission is the first channel access mode when the channel access type indicated by the channel access indication information is Type 2A channel access; or the terminal device may determine that the channel access mode corresponding to the first uplink transmission is the second channel access mode when the channel access type indicated by the channel access indication information is not Type 2A channel access.

As an example, the terminal device may determine the channel access mode corresponding to the first uplink transmission is the first channel access mode when the channel access indication information received by the terminal device indicates "1" or "2" (Type 2A channel access) in Table 1; or the terminal device may determine that the channel access mode corresponding to the first uplink transmission is the second channel access mode when the channel access indication information received by the terminal device indicates "0" or "3" (non-Type 2A channel access) in Table 1. Further, the terminal device may determine that the channel access mode corresponding to the first uplink transmission is the first channel access sub-mode when the channel access indication information received by the terminal device indicates "0" (Type 2C channel access) in Table 1; or the terminal device may determine that the channel access mode corresponding to the first uplink transmission is the second channel access sub-mode when the channel access indication information received by the terminal device indicates "3" (Type 1 channel access) in Table 1.

In at least one embodiment, the terminal device may determine that the channel access mode corresponding to the first uplink transmission is the first channel access mode when the channel access type indicated by the channel access indication information is Type 2B channel access; or the terminal device may determines that the channel access mode corresponding to the first uplink transmission is the second channel access mode when the channel access type indicated by the channel access indication information is not Type 2B channel access.

In at least one embodiment, the terminal device may determine that the channel access mode corresponding to the first uplink transmission is the first channel access mode when the channel access type indicated by the channel access indication information is Type 2C channel access; or the terminal device may determine that the channel access mode corresponding to the first uplink transmission is the second channel access mode when the channel access type indicated by the access indication information is not Type 2C channel access.

In at least one embodiment, the terminal device may determine that the channel access mode corresponding to the first uplink transmission is the first channel access mode when the channel access indication information indicates a second predetermined value; or the terminal device may determine that the channel access mode corresponding to the first uplink transmission is the second channel access mode when the channel access indication information does not indicate the second predetermined value.

As an example, the second predetermined value may be "00". When the channel access indication information indicates "00", the terminal device may determine that the channel access mode corresponding to the first uplink transmission is the first channel access mode; or when the channel access indication information indicates "01", "10" or "11", the terminal device may determine that the channel access mode corresponding to the first uplink transmission is the second channel access mode.

In at least one embodiment, the terminal device may determine that the channel access mode corresponding to the first uplink transmission is the first channel access mode when the channel access indication information indicates a second predetermined value; or the terminal device may determine that the channel access mode corresponding to the first uplink transmission is the second channel access mode when the channel access indication information indicates a third predetermined values, the second predetermined value being different from the third predetermined value.

As an example, the second predetermined value may be "00", and the third predetermined value may be "11". When the channel access indication information indicates "00", the terminal device may determine that the channel access mode corresponding to the first uplink transmission is the first channel access mode; or when the channel access indication information indicates "11", the terminal device may determine that the channel access mode corresponding to the first uplink transmission is the second channel access mode.

In at least one embodiment, the channel access indication information may include at least one bit indicating the channel access mode corresponding to the first uplink transmission.

In at least one embodiment, the at least one bit may include 2 bits.

In other words, the information field indicated by the channel access indication information in the FBE mode may be redesigned.

As an example, the channel access indication information may include 2 bits, and the indicated information field is shown in Table 3 below. The terminal device may determine the channel access mode corresponding to the first uplink transmission according to the indication of the channel access indication information. It should be understood that Table 3 is illustrative only, and the present disclosure is not limited to any mapping between channel access indication information and channel access types.

TABLE 3

| Third Indication Set | |
|---|---|
| Channel Access Indication Information | Channel Access Type |
| 0 | First Channel Access Mode |
| 1 | First Channel Access Sub-Mode |
| 2 | Second Channel Access Sub-Mode |
| 3 | Reserved Bits |

In some embodiments of the present disclosure, S220 may include:

the terminal device determining the channel access mode corresponding to the first uplink transmission according to a predetermined rule.

In at least one embodiment, the terminal device may determine that the channel access mode corresponding to the first uplink transmission is the first channel access mode when the terminal device is configured with a COT shared energy detection threshold; or the terminal device may determine that the channel access mode corresponding to the first uplink transmission is the second channel access mode when the terminal device is not configured with the COT shared energy detection threshold.

In at least one embodiment, the terminal device may determine the channel access mode corresponding to the first uplink transmission based on at least one of the following schemes:

the terminal device may determine that the channel access mode corresponding to the first uplink transmission is the second channel access mode when the first time domain resource is within a second COT of a network device and the terminal device receives a downlink signal or downlink channel transmitted by the network device before the first time domain resource within the second COT;

the terminal device may determine that the channel access mode corresponding to the first uplink transmission is the first channel access mode when the first time domain resource is within the second COT and the terminal device receives no downlink signal or downlink channel transmitted by the network device before the first time domain resource in the second COT;

the terminal device may determine that the channel access mode corresponding to the first uplink transmission is the first channel access mode when the first time domain resource is not within COT of the network device;

the terminal device may determine that the channel access mode corresponding to the first uplink transmission is the first channel access mode when first DCI is within the second COT and the first time domain resource is not within the second COT;

the terminal device may determine that the channel access mode corresponding to the first uplink transmission is the second channel access mode when the first DCI is within the second COT and the first time domain resource is within the second COT; or the terminal device may determine the channel access mode corresponding to the first uplink transmission according to the channel access indication information in the first DCI when the first DCI is within the second COT and the first time domain resource is within the second COT.

Here, the first DCI is used to schedule the first uplink transmission.

In some embodiments of the present disclosure, the method 200 may further include:

determining, by the terminal device, a Cyclic Prefix Extension (CPE) length used by the terminal device for transmitting the first uplink transmission, according to the channel access mode corresponding to the first uplink transmission.

In at least one embodiment, when the channel access mode corresponding to the first uplink transmission is the first channel access mode, the terminal device may determine that the CPE length used by the terminal device for transmitting the first uplink transmission is 0, or the terminal device may determine that the CPE length corresponding to the first uplink transmission is 0.

In at least one embodiment, when the channel access mode corresponding to the first uplink transmission is the first channel access mode, the terminal device may ignore a CPE length indicated by channel access indication information in first DCI used for scheduling the first uplink transmission; the terminal device may expect the CPE length indicated by the channel access indication information in the first DCI to be 0; or the terminal device may not expect the CPE length indicated by the channel access indication information in the first DCI not to be 0.

As an example, when the terminal device determines that the channel access mode corresponding to the first uplink transmission is the first channel access mode, if the CPE length indicated by the channel access indication information in the first DCI used for scheduling the first uplink transmission as received by the terminal device is not 0, the terminal device may ignore the indicated CPE length information, or the terminal device may determine that the CPE length used by the terminal device for transmitting the first uplink transmission is 0, or the terminal device may determine that the CPE length corresponding to the first uplink transmission is 0.

In at least one embodiment, in some embodiments of the present disclosure, the terminal device determining the channel access mode corresponding to the first uplink transmission may also be regarded as the terminal device assuming the channel access mode corresponding to the first uplink transmission.

In some embodiments of the present disclosure, the method 200 may further include:

the terminal device determining, when the terminal device is configured with a COT shared energy detection threshold, whether to perform channel sensing based on the COT shared energy detection threshold according to the channel access mode corresponding to the first uplink transmission.

In at least one embodiment, the terminal device may perform channel sensing based on the COT shared energy detection threshold when the terminal device is configured with the COT shared energy detection threshold and the channel access mode corresponding to the first uplink transmission is the first channel access mode.

In at least one embodiment, the terminal device may perform channel sensing based on the COT shared energy detection threshold, or the terminal device may not perform channel sensing based on the COT shared energy detection threshold, when the terminal device is configured with the COT shared energy detection threshold and the channel access mode corresponding to the first uplink transmission is the second channel access mode.

In at least one embodiment, the COT shared energy detection threshold may be determined according to transmission power of a network device.

In at least one embodiment, when the start position of the first time domain resource is different from the start position of the first COT (or the start position of the first time domain resource is different from the start position of the first channel occupancy), the terminal device may transmit the first uplink transmission according to the CPE length indicated by the channel access indication information in the first DCI.

In at least one embodiment, when the channel access mode corresponding to the first uplink transmission is the first channel access mode and the terminal device is configured with a COT shared energy detection threshold, the terminal device may perform channel sensing according to the first channel access mode and the COT shared energy detection threshold.

In at least one embodiment, when the channel access mode corresponding to the first uplink transmission is the second channel access mode and the terminal device is configured with a COT shared energy detection threshold, the terminal device may perform channel sensing according to the second channel access mode and the COT shared energy detection threshold. For example, the second channel access mode may correspond to the second channel access sub-mode in the second channel access mode.

In at least one embodiment, when the channel access mode corresponding to the first uplink transmission is the second channel access mode and the terminal device is configured with a COT shared energy detection threshold, the terminal device can perform channel sensing according to the second channel access mode but not according to the COT shared energy detection threshold. For example, the second channel access mode may correspond to the second channel access sub-mode in the second channel access mode.

In at least one embodiment, when the channel access mode corresponding to the first uplink transmission is the second channel access mode and the terminal device is configured with a COT shared energy detection threshold, the terminal device may not perform channel sensing according to the COT shared energy detection threshold. For example, the second channel access mode may correspond to the first channel access sub-mode or the second channel access sub-mode in the second channel access mode.

In at least one embodiment, when the terminal device is configured with a COT shared energy detection threshold, the COT shared energy detection threshold may be associated with the first channel access mode.

In some embodiments of the present disclosure, the channel access mode corresponding to the first uplink transmission may further used to determine whether a resource in first Channel Occupancy Time (COT) is usable for downlink transmission, the first channel occupancy including the first COT.

In other words, when the channel access mode corresponding to the first uplink transmission is the first channel access mode, the network device may share the resource in the first COT for downlink transmission.

In at least one embodiment, when the channel access mode corresponding to the first uplink transmission is the first channel access mode, the resource in the first COT may be usable for the downlink transmission. For example, the network device may use the resource in the first COT for downlink transmission. Alternatively, when the channel access mode corresponding to the first uplink transmission is the second channel access mode, the resource in the first COT may be unusable for the downlink transmission. For example, the network device may not use the resource in the first COT for downlink transmission.

In at least one embodiment, when the channel access mode corresponding to the first uplink transmission is the first channel access mode and the terminal device is not configured with a COT shared energy detection threshold, the resource in the first COT may be usable for the downlink transmission. For example, the network device may use the resource in the first COT for downlink transmission. Here, a time length for the downlink transmission in the first COT may be smaller than or equal to a fourth predetermined value.

In at least one embodiment, the fourth predetermined value may be dependent on a subcarrier spacing, and/or the fourth predetermined value may be in units of milliseconds, subframes, time slots, or symbols.

As an example, for a subcarrier spacing of 15 kHz, 30 kHz, or 60 kHz, the fourth predetermined value may be 2, 4, or 8 symbols, respectively.

In some embodiments of the present disclosure, the first periodic channel occupancy may be channel occupancy usable by the terminal device to initiate the COT as configured for the terminal device. Here, when the terminal device is a terminal device in an idle state (RRC_IDLE state) or in an inactive state (RRC_INACTIVE state), the first periodic channel occupancy may be configured by the network device via a system message.

When the terminal device is a terminal device in a connected state (RRC_CONNECTED state), the first periodic channel occupancy may be configured by the network device via Radio Resource Control (RRC) signaling dedicated to the terminal device.

In some embodiments of the present disclosure, an end position of the COT in the first periodic channel occupancy may be determined according to a maximum COT length corresponding to the first periodic channel occupancy, or the end position of the COT in the first periodic channel occupancy may be determined according to an end position of the COT in a second periodic channel occupancy.

In at least one embodiment, the second periodic channel occupancy may include channel occupancy for a network device to initiate COT, or the second periodic channel occupancy may include channel occupancy for the terminal device to initiate COT.

In some embodiments of the present disclosure, the first periodic channel occupancy may correspond to a first Bandwidth Part (BWP), the first BWP including an active BWP and/or a configured BWP of the terminal device. In at least one embodiment, the first BWP may include an uplink BWP and/or a downlink BWP of the terminal device.

In at least one embodiment, when the terminal device is configured with a plurality of BWPs, the plurality of BWPs may correspond to the same first periodic channel occupancy, or the terminal device may not expect that different BWPs of the plurality of BWPs correspond to different periodic channel occupancy.

In some embodiments of the present disclosure, the first uplink transmission may include at least one of a Physical Uplink Shared Channel (PUSCH), a Physical Uplink Control Channel (PUCCH), a Sounding Reference Signal (SRS), or a Physical Random Access Channel (PRACH).

The present disclosure further provides a method in a network device for configuring periodic channel occupancy (or periodic FFP) for a terminal device.

The network device configures a first periodic FFP for the terminal device. The first periodic FFP is a periodic FFP for the terminal device to initiate channel occupancy.

In at least one embodiment, the first periodic FFP may be a periodic FFP for the terminal device in an idle state or an inactive state to initiate channel occupancy.

In at least one embodiment, the network device may configure the first periodic FFP for the terminal device via a system message, such as SIB1.

In at least one embodiment, the first periodic FFP may be associated with an initial BWP, or in other words, the network device may configure the first periodic FFP for the initial BWP of the terminal device.

In at least one embodiment, the network device may configure the first periodic FFP for the terminal device in the same manner as the network device configures a second periodic FFP for the terminal device. The second periodic FFP is a periodic FFP configured by the network device for the terminal device, for the network device to initiate channel occupancy.

In at least one embodiment, a length of the first periodic FFP may be the same as a length of the second periodic FFP. In at least one embodiment, an end position of the COT in the first periodic FFP may be the same as an end position of the COT in the second periodic FFP. In at least one embodiment, the end position of the COT in the first periodic FFP may be determined according to the end position of the COT in the second periodic FFP, or the end position of the COT in the second periodic FFP may be determined according to the end position of the COT in the first periodic FFP.

In at least one embodiment, the length of the second periodic FFP may be an integer multiple of the length of the first periodic FFP, or the length of the first periodic FFP may be an integer multiple of the length of the second periodic FFP. In at least one embodiment, the end position of the COT in the first periodic FFP may be the same as the end position of the COT in the second periodic FFP. In at least one embodiment, the end position of the COT in the first periodic FFP may be determined according to the end position of the COT in the second periodic FFP, or the end position of the COT in the second periodic FFP may be determined according to the end position of the COT in the first periodic FFP.

In at least one embodiment, the end position of the COT in the first periodic FFP may be determined according to the end position of the COT in the second periodic FFP and/or a maximum COT length in the first period FFP. In at least one embodiment, the end position of the COT in the second period FFP may be determined according to the end position of the COT in the first period FFP and/or a maximum COT length in the second period FFP.

In at least one embodiment, the first periodic FFP may be determined according to a PRACH configuration. For example, a start position of the first periodic FFP is the same as the start position of the first configured PRACH resource (or RACH Occasion (RO)) in a PRACH resource period.

Alternatively, the start position of the first periodic FFP may be the same as the start position of the first configured valid PRACH resource (or valid RO) in the PRACH resource period.

In at least one embodiment, the first periodic FFP may be determined according to a first period and a first offset value. The first offset value is associated with a boundary of an SFN. In at least one embodiment, the first period may also be considered as a length of the first periodic FFP.

The network device may configure a third periodic FFP for the terminal device. The third periodic FFP is a periodic FFP for the terminal device to initiate channel occupancy.

In at least one embodiment, the third periodic FFP may be a periodic FFP for the terminal device in the RRC connected state to initiate channel occupancy.

In at least one embodiment, the network device may configure the third periodic FFP for the terminal device via RRC signaling dedicated to the terminal device.

In at least one embodiment, the third periodic FFP may associated with a first BWP, or in other words, the network device may configure the third periodic FFP for the first BWP of the terminal device. In at least one embodiment, the first BWP may include an active BWP and/or a configured BWP of the terminal device. In at least one embodiment, the first BWP may include an uplink BWP and/or a downlink BWP of the terminal device.

In at least one embodiment, the terminal device may be configured with a plurality of BWPs, and the plurality of BWPs may correspond to the same third periodic FFP, or the terminal device may not expect that the FFPs configured in the plurality of BWPs are different. In at least one embodiment, the plurality of BWPs may include an uplink BWP and/or a downlink BWP of the terminal device.

In at least one embodiment, a length of the second periodic FFP may be an integer multiple of the length of the third periodic FFP, or the length of the third periodic FFP may be an integer multiple of the length of the second periodic FFP. In at least one embodiment, an end position of the COT in the third periodic FFP may be the same as the end position of the COT in the second periodic FFP. In at least one embodiment, the end position of the COT in the third periodic FFP may be determined according to the end position of the COT in the second periodic FFP, or the end position of the COT in the second periodic FFP may be determined according to the end position of the COT in the third periodic FFP.

In at least one embodiment, the end position of the COT in the third periodic FFP may be determined according to the end position of the COT in the second period FFP and/or a maximum COT length in the third periodic FFP. In at least one embodiment, the end position of the COT in the second periodic FFP may be determined according to the end position of the COT in the third periodic FFP and/or a maximum COT length in the second periodic FFP.

Embodiment 1

FIG. 4 is a schematic timing diagram of channel occupancy according to an embodiment of the present disclosure.

As shown in FIG. 4, it is assumed that the length of the second periodic FFP is 10 milliseconds, and the length of the third periodic FFP is 5 milliseconds. In the time domain, the offset between the second periodic FFP and the third periodic FFP is 0.5 milliseconds (ms). Here, the end position of the COT in the third periodic FFP is determined according to the end position of the COT in the second periodic FFP and/or the maximum COT length in the third periodic FFP.

For example, the end position of the COT in one FFP in the third periodic FFP is determined according to the maximum COT length in the third periodic FFP; the end position of the COT in another FFP in the third periodic FFP is determined according to the end position of the COT in the second periodic FFP, or the end position of the COT in another FFP in the third periodic FFP is the same as the end position of the COT in the second periodic FFP.

Example 2

Figure 5:
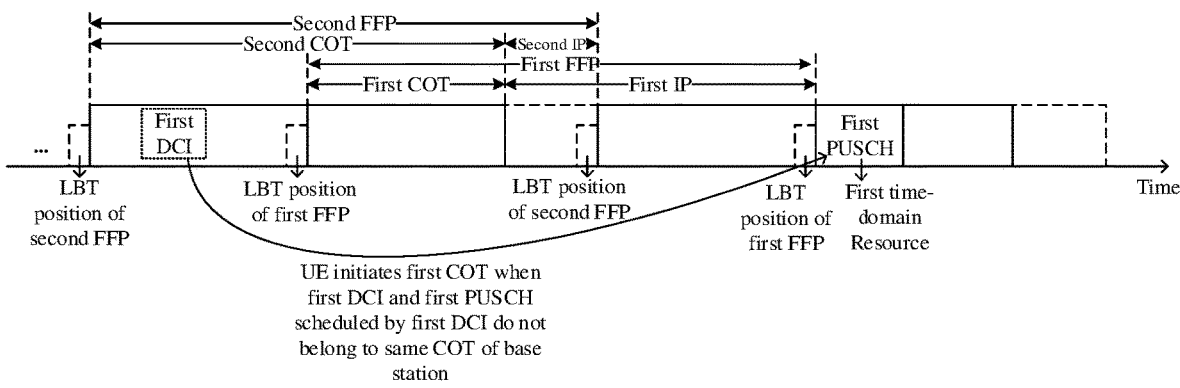
Figure 6:
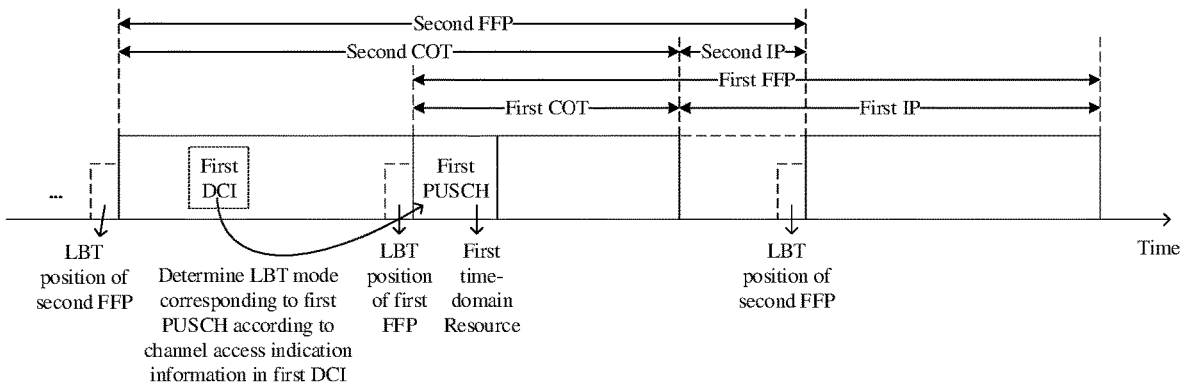

Both FIG. 5 and FIG. 6 are schematic timing diagrams of channel occupancy according to embodiments of the present disclosure.

As shown in FIG. 5 and FIG. 6, the terminal device determines a first FFP and a second FFP. Here, the first FFP is an FFP in the first periodic FFP usable by the terminal device to initiate channel occupancy as configured for the terminal device. The second FFP is an FFP in the second periodic FFP for the network device to initiate channel occupancy. The terminal device receives first DCI transmitted by the network device, and the first DCI is used to schedule the terminal device to transmit a first PUSCH over a first time domain resource. The start position of the first time domain resource is the same as the start position of the first FFP.

In some possible implementations, the first DCI includes channel access indication information, and the terminal device determines the channel access mode corresponding to the first PUSCH according to the channel access indication information.

As shown in FIG. 6, when the CPE length indicated by the channel access indication information is 0, the terminal device determines that the channel access mode corresponding to the first PUSCH is the first channel access mode, or the terminal device determines that the LBT mode corresponding to the first PUSCH is a channel access mode to initiate first COT. Specifically, the terminal device performs channel sensing with a detection time slot length of 9 microseconds before the start position of the first time domain resource, and starts to transmit the first PUSCH from the start position of the first COT after the channel sensing succeeds.

If the CPE length indicated by the channel access indication information is not 0, the terminal device determines that the channel access mode corresponding to the first PUSCH is the second channel access mode, or the terminal device determines that the LBT mode corresponding to the first PUSCH is a channel access mode to share the COT of the network device. Further, if the channel access mode indicated by the channel access indication information is Type 2C channel access or Type 2B channel access, then the terminal device determines that the channel access mode corresponding to the first PUSCH is the first channel access sub-mode, or the terminal device may start to transmit the first PUSCH without performing channel sensing. If the channel access mode indicated by the channel access indication information is Type 2A channel access or Type 1 channel access, the terminal device determines that the channel access mode corresponding to the first PUSCH is the second channel access sub-mode, or the terminal device performs channel sensing with a detection time slot length of 9 microseconds within an interval of 25 microseconds before the start of the first time domain resource, and transmits the first PUSCH after the channel sensing succeeds.

In some possible implementations, the terminal device determines the channel access mode corresponding to the first PUSCH according to a predetermined rule. For example, the terminal device determines the channel access mode corresponding to the first PUSCH according to the position of the first time domain resource.

As shown in FIG. 5, if the first DCI is within the second COT of the network device, and the first time domain resource over which the first PUSCH scheduled by the first DCI is transmitted is not within the second COT of the network device, the terminal device determines that the channel access mode corresponding to the first PUSCH is the first channel access mode, or the terminal device determines that the LBT mode corresponding to the first PUSCH is the channel access mode to initiate the COT. Specifically, the terminal device performs channel sensing with a detection time slot length of 9 microseconds before the start position of the first time domain resource, and starts to transmit the first PUSCH from the start position of the first COT after the channel sensing succeeds.

As shown in FIG. 6, if the first DCI is within the second COT of the network device, and the first time domain resource over which the first PUSCH scheduled by the first DCI is transmitted is also within the second COT of the network device, the terminal device determines that the channel access mode corresponding to the first PUSCH is the second channel access mode, or the terminal device determines that the LBT mode corresponding to the first PUSCH is the channel access mode to share the COT of the network device. Further, if the channel access mode indicated by the channel access indication information in the first DCI is Type 2C channel access or Type 2B channel access, the terminal device determines that the channel access mode corresponding to the first PUSCH is the first channel access sub-mode, or the terminal device may start to transmit the first PUSCH without performing channel sensing. If the channel access mode indicated by the channel access indication information is Type 2A channel access or Type 1 channel access, the terminal device determines that the channel access mode corresponding to the first PUSCH is the second channel access sub-mode, or the terminal device performs channel sensing with a detection time slot length of 9 microseconds within an interval of 25 microseconds before the start of the first time domain resource, and transmits the first PUSCH after the channel sensing succeeds.

The preferred embodiments of the present disclosure have been described in detail above in conjunction with the accompanying drawings. However, the present disclosure is not limited to the specific details in the above embodiments. Within the scope of the technical concept of the present disclosure, various simple modifications can be made to the technical solutions of the present disclosure. These simple modifications all belong to the protection scope of the present disclosure. For example, the specific technical features described in the above specific implementations can be combined in any suitable manner, provided that they do not conflict. These possible combinations will not be described in detail here for simplicity. As another example, any combination of various implementations of the present disclosure can also be made, as long as they do not violate the idea of the present disclosure, and they should also be regarded as the content disclosed in the present disclosure.

It should also be understood that in the method embodiments of the present disclosure, the sequence numbers of the above processes do not mean the order of execution, and the order of execution of the processes should be determined by their functions and internal logics, and should not constitute any limitation on the implementations of the embodiments of the present disclosure. In addition, in the embodiments of the present disclosure, the terms "downlink" and "uplink" are used to indicate the transmission direction of signals or data, where "downlink" is used to indicate that the transmission direction of signals or data is a first direction from a station to a user equipment in a cell, and "uplink" is used to indicate that the signal or data transmission direction is a second direction from a user equipment in a cell to a station. For example, a "downlink signal" indicates that the signal transmission direction is the first direction. In addition, in the embodiments of the present disclosure, the term "and/or" is only an association relationship describing associated objects, indicating that there may be three relationships. Specifically, A and/or B may mean: A only, both A and B, and B only. In addition, the symbol "/" as used herein represents an "or" relationship between the correlated objects preceding and succeeding the symbol.

The wireless communication method according to the embodiment of the present disclosure has been described in detail from the perspective of the terminal device in conjunction with FIG. 2 to FIG. 6 above, and the wireless communication method according to the embodiment of the present disclosure will be described below from the perspective of the network device in conjunction with FIG. 7.

Figure 7:
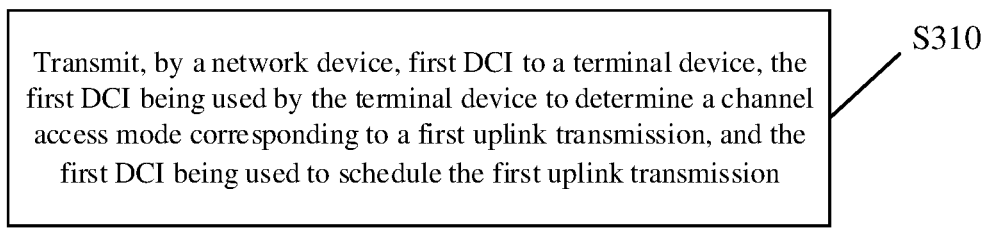
FIG. 7 is a schematic flowchart illustrating a wireless communication method according to an embodiment of the present disclosure.

FIG. 7 is a schematic flowchart illustrating a wireless communication method 300 according to an embodiment of the present disclosure. The method 300 may be performed by a network device as shown in FIG. 1.

As shown in FIG. 7, the method 300 may include:

At S310, a network device transmits first Downlink Control Information (DCI) to a terminal device. The first DCI is used by the terminal device to determine a channel access mode corresponding to a first uplink transmission. The first DCI is used to schedule the first uplink transmission.

In other words, the terminal device receives the first DCI transmitted by the network device.

In some embodiments of the present disclosure, the method 300 may further include:

transmitting, by the network device, first configuration information to the terminal device, the first configuration information being used to configure a Channel Occupancy Time (COT) shared energy detection threshold.

In other words, the terminal device receives the first configuration information transmitted by the network device.

In some embodiments of the present disclosure, the method 300 may further include:

transmitting, by the network device, second configuration information to the terminal device, the second configuration information being used to configure first periodic channel occupancy, the first periodic channel occupancy including channel occupancy for the terminal device to initiate Channel Occupancy Time (COT).

In other words, the terminal device receives the second configuration information transmitted by the network device.

In some embodiments of the present disclosure, the first periodic channel occupancy may be channel occupancy usable by the terminal device to initiate the COT as configured for the terminal device. When the terminal device is a terminal device in an idle state or an inactive state, the first periodic channel occupancy may be configured by the network device via a system message. Alternatively, when the terminal device is a terminal device in a connected state, the first periodic channel occupancy may be configured by the network device via RRC signaling dedicated to the terminal device.

It should be understood that for steps in the method 300, reference may be made to corresponding steps in the method 200, and for the sake of brevity, details will not be repeated here. For example, the network device may also determine the channel access mode corresponding to the first uplink transmission in a manner similar to that of the terminal device. For example, the channel access mode corresponding to the first uplink transmission may be determined based on the channel access indication information in the first DCI. In another example, the channel access mode corresponding to the first uplink transmission may be determined based on the predetermined rule mentioned above.

The method embodiments of the present disclosure have been described in detail above with reference to FIG. 1 to FIG. 7, and the device embodiments of the present disclosure will be described in detail below in conjunction with FIG. 8 to FIG. 11.

Figures 8, 9:
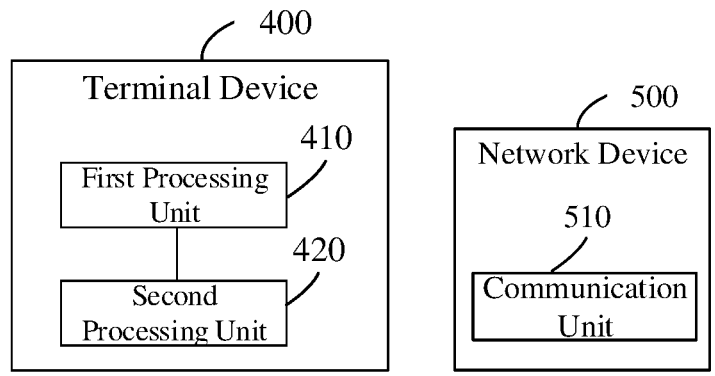
FIG. 8 is a schematic block diagram of a terminal device according to an embodiment of the present disclosure.
FIG. 9 is a schematic block diagram of a network device according to an embodiment of the present disclosure.

FIG. 8 is a schematic block diagram of a terminal device 400 according to an embodiment of the present disclosure.

As shown in FIG. 8, the terminal device 400 may include:

a first processing unit 410 configured to determine first periodic channel occupancy, the first periodic channel occupancy including channel occupancy for the terminal device to initiate Channel Occupancy Time (COT), and the first periodic channel occupancy including first channel occupancy; and a second processing unit 420 configured to determine a channel access mode corresponding to a first uplink transmission, a start position of the first channel occupancy being same as a start position of a first time domain resource, and the first time domain resource being used by the terminal device for transmitting the first uplink transmission.

In some embodiments of the present disclosure, the channel access mode corresponding to the first uplink transmission may include a first channel access mode and/or a second channel access mode.

In some embodiments of the present disclosure, the first channel access mode may include a channel access mode which is used to initiate a COT by the terminal device.

In some embodiments of the present disclosure, the first channel access mode may include performing channel sensing with a fixed detection time slot length; or the first channel access mode may include: the terminal device performing channel sensing with a fixed detection time slot length of 9 microseconds before the first time domain resource, and when the channel sensing succeeds, the terminal device transmitting the first uplink transmission over the first time domain resource, or when the channel sensing fails, the terminal device not transmitting the first uplink transmission over the first time domain resource.

In some embodiments of the present disclosure, when the terminal device is configured with a COT shared energy detection threshold, the terminal device may perform channel sensing using the COT shared energy detection threshold in the first channel access mode.

In some embodiments of the present disclosure, the second channel access mode may include a channel access mode which is used to share a COT of a network device.

In some embodiments of the present disclosure, the second channel access mode may include a first channel access sub-mode and/or a second channel access sub-mode, the first channel access sub-mode including performing no channel sensing, and the second channel access sub-mode including performing channel sensing with a fixed detection time slot length within a fixed interval.

In some embodiments of the present disclosure, the first channel access sub-mode may include: when a gap between the first uplink transmission and a first downlink transmission burst does not exceed 16 microseconds, the terminal device starting to transmit the first uplink transmission without performing channel sensing after the first downlink transmission burst ends; and/or the second channel access sub-mode may include: when the gap between the first uplink transmission and the first downlink transmission burst exceeds 16 microseconds, the terminal device performing channel sensing with a fixed detection time slot length of 9 microseconds within a fixed interval of 25 microseconds before starting the first uplink transmission, and transmitting the first uplink transmission after the channel sensing succeeds.

The first uplink transmission and the first downlink transmission burst may belong to same COT of the network device.

In some embodiments of the present disclosure, the second processing unit 420 may be configured to:

determine the channel access mode corresponding to the first uplink transmission according to first Downlink Control Information (DCI) used for scheduling the first uplink transmission.

In some embodiments of the present disclosure, the second processing unit 420 may be configured to:

determine the channel access mode corresponding to the first uplink transmission according to channel access indication information in the first DCI.

In some embodiments of the present disclosure, the channel access indication information may indicate a Cyclic Prefix Extension (CPE) length, and the second processing unit 420 may be configured to:

determine that the channel access mode corresponding to the first uplink transmission is the first channel access mode when the CPE length indicated by the channel access indication information is a first predetermined value or corresponds to the first predetermined value, or determine that the channel access mode corresponding to the first uplink transmission is the second channel access mode when the CPE length indicated by the channel access indication information is not the first predetermined value or does not correspond to the first predetermined value.

In some embodiments of the present disclosure, the channel access indication information may further indicate a channel access type, and the second processing unit 420 may be configured to:

when the CPE length indicated by the channel access indication information is not the first predetermined value or does not correspond to the first predetermined value: determine that the channel access mode corresponding to the first uplink transmission is a first channel access sub-mode in the second channel access mode when the channel access type indicated by the channel access indication information is Type 2C or Type 2B, or determine that the channel access mode corresponding to the first uplink transmission is a second channel access sub-mode in the second channel access mode when the channel access type indicated by the channel access indication information is Type 2A or Type 1.

In some embodiments of the present disclosure, the first predetermined value may be 0.

In some embodiments of the present disclosure, the channel access indication information may indicate a channel access type, and the second processing unit 420 may be configured to:

determine that the channel access mode corresponding to the first uplink transmission is the first channel access mode when the channel access type indicated by the channel access indication information is a first type, or determine that the channel access mode corresponding to the first uplink transmission is the second channel access mode when the channel access type indicated by the channel access indication information is not the first type.

In some embodiments of the present disclosure, the channel access indication information may further indicate a CPE length, and the second processing unit 420 may be configured to:

when the channel access type indicated by the channel access indication information is not the first type: determine that the channel access mode corresponding to the first uplink transmission is a first channel access sub-mode in the second channel access mode when the CPE length indicated by the channel access indication information corresponds to 16 microseconds, or determine that the channel access mode corresponding to the first uplink transmission is a second channel access sub-mode in the second channel access mode when the CPE length indicated by the channel access indication information does not correspond to 16 microseconds.

In some embodiments of the present disclosure, the first type may include at least one of: Type 2A, Type 2B, Type 2C, or Type 1.

In some embodiments of the present disclosure, the second processing unit 420 may be configured to:

determine that the channel access mode corresponding to the first uplink transmission is the first channel access mode when the channel access indication information indicates a second predetermined value; or determine that the channel access mode corresponding to the first uplink transmission is the second channel access mode when the channel access indication information does not indicate the second predetermined value.

In some embodiments of the present disclosure, the second processing unit 420 may be configured to:

determine that the channel access mode corresponding to the first uplink transmission is the first channel access mode when the channel access indication information indicates a second predetermined value; or determine that the channel access mode corresponding to the first uplink transmission is the second channel access mode when the channel access indication information indicates a third predetermined values, the second predetermined value being different from the third predetermined value.

In some embodiments of the present disclosure, the channel access indication information may include at least one bit indicating the channel access mode corresponding to the first uplink transmission.

In some embodiments of the present disclosure, the at least one bit may include 2 bits.

In some embodiments of the present disclosure, the second processing unit 420 may be configured to:

determine the channel access mode corresponding to the first uplink transmission according to a predetermined rule.

In some embodiments of the present disclosure, the second processing unit 420 may be configured to:

determine that the channel access mode corresponding to the first uplink transmission is the first channel access mode when the terminal device is configured with a COT shared energy detection threshold; or determine that the channel access mode corresponding to the first uplink transmission is the second channel access mode when the terminal device is not configured with the COT shared energy detection threshold.

In some embodiments of the present disclosure, the second processing unit 420 may be configured to perform at least one of:

determining that the channel access mode corresponding to the first uplink transmission is the second channel access mode when the first time domain resource is within a second COT of a network device and the terminal device receives a downlink signal or downlink channel transmitted by the network device before the first time domain resource within the second COT;

determining that the channel access mode corresponding to the first uplink transmission is the first channel access mode when the first time domain resource is within the second COT and the terminal device receives no downlink signal or downlink channel transmitted by the network device before the first time domain resource in the second COT;

determining that the channel access mode corresponding to the first uplink transmission is the first channel access mode when the first time domain resource is not within COT of the network device;

determining that the channel access mode corresponding to the first uplink transmission is the first channel access mode when first DCI is within the second COT and the first time domain resource is not within the second COT;

determining that the channel access mode corresponding to the first uplink transmission is the second channel access mode when the first DCI is within the second COT and the first time domain resource is within the second COT; or determining the channel access mode corresponding to the first uplink transmission according to the channel access indication information in the first DCI when the first DCI is within the second COT and the first time domain resource is within the second COT.

The first DCI is used to schedule the first uplink transmission.

In some embodiments of the present disclosure, the second processing unit 420 may be further configured to:

determine a Cyclic Prefix Extension (CPE) length used by the terminal device for transmitting the first uplink transmission, according to the channel access mode corresponding to the first uplink transmission.

In some embodiments of the present disclosure, the second processing unit 420 may be configured to:

determine that the CPE length used by the terminal device for transmitting the first uplink transmission is 0 when the channel access mode corresponding to the first uplink transmission is the first channel access mode.

In some embodiments of the present disclosure, the second processing unit 420 may be configured to:

when the channel access mode corresponding to the first uplink transmission is the first channel access mode: ignore a CPE length indicated by channel access indication information in first DCI used for scheduling the first uplink transmission; expect the CPE length indicated by the channel access indication information in the first DCI to be 0; or not expect the CPE length indicated by the channel access indication information in the first DCI not to be 0.

In some embodiments of the present disclosure, the second processing unit 420 may be further configured to:

determine, when the terminal device is configured with a COT shared energy detection threshold, whether to perform channel sensing based on the COT shared energy detection threshold according to the channel access mode corresponding to the first uplink transmission.

In some embodiments of the present disclosure, the second processing unit 420 may be configured to:

perform channel sensing based on the COT shared energy detection threshold when the terminal device is configured with the COT shared energy detection threshold and the channel access mode corresponding to the first uplink transmission is the first channel access mode.

In some embodiments of the present disclosure, the second processing unit 420 may be configured to:

perform channel sensing based on the COT shared energy detection threshold, or not perform channel sensing based on the COT shared energy detection threshold, when the terminal device is configured with the COT shared energy detection threshold and the channel access mode corresponding to the first uplink transmission is the second channel access mode.

In some embodiments of the present disclosure, the COT shared energy detection threshold may be determined according to transmission power of a network device.

In some embodiments of the present disclosure, the channel access mode corresponding to the first uplink transmission may be further used to determine whether a resource in first Channel Occupancy Time (COT) is usable for downlink transmission, the first channel occupancy including the first COT.

In some embodiments of the present disclosure, the resource in the first COT may be usable for the downlink transmission when the channel access mode corresponding to the first uplink transmission is the first channel access mode, or the resource in the first COT may be unusable for the downlink transmission when the channel access mode corresponding to the first uplink transmission is the second channel access mode.

In some embodiments of the present disclosure, the resource in the first COT may be usable for the downlink transmission when the channel access mode corresponding to the first uplink transmission is the first channel access mode and the terminal device is not configured with a COT shared energy detection threshold. A time length for the downlink transmission in the first COT is smaller than or equal to a fourth predetermined value.

In some embodiments of the present disclosure, the fourth predetermined value may be dependent on a subcarrier spacing, and/or the fourth predetermined value may be in units of milliseconds, subframes, time slots, or symbols.

In some embodiments of the present disclosure, the first periodic channel occupancy may be channel occupancy usable by the terminal device to initiate the COT as configured for the terminal device. When the terminal device is a terminal device in an idle state or an inactive state, the first periodic channel occupancy may be configured by a network device via a system message; or when the terminal device is a terminal device in a connected state, the first periodic channel occupancy may be configured by the network device via RRC signaling dedicated to the terminal device.

In some embodiments of the present disclosure, an end position of the COT in the first periodic channel occupancy may be determined according to a maximum COT length corresponding to the first periodic channel occupancy, or the end position of the COT in the first periodic channel occupancy may be determined according to an end position of the COT in a second periodic channel occupancy.

In some embodiments of the present disclosure, the second periodic channel occupancy may include channel occupancy for a network device to initiate COT, or the second periodic channel occupancy may include channel occupancy for the terminal device to initiate COT.

In some embodiments of the present disclosure, the first periodic channel occupancy may correspond to a first Bandwidth Part (BWP), the first BWP including an active BWP and/or a configured BWP of the terminal device.

In some embodiments of the present disclosure, when the terminal device is configured with a plurality of BWPs, the plurality of BWPs may correspond to the same first periodic channel occupancy, or the terminal device may not expect that different BWPs of the plurality of BWPs correspond to different periodic channel occupancy.

In some embodiments of the present disclosure, the first uplink transmission may include at least one of a Physical Uplink Shared Channel (PUSCH), a Physical Uplink Control Channel (PUCCH), a Sounding Reference Signal (SRS), or a Physical Random Access Channel (PRACH).

It should be understood that the device embodiments and the method embodiments may correspond to each other, and for similar descriptions, reference can be made to the method embodiments. In particular, the terminal device 400 as shown in FIG. 8 may corresponding to the corresponding entity for performing the method 200 according to the embodiment of the present disclosure, and the above and other operations and/or functions of the respective units in the terminal device 400 are provided for implementing the corresponding processes in the respective methods in FIG. 2. For brevity, details thereof will be omitted here.

FIG. 9 is a schematic block diagram of a network device 500 according to an embodiment of the present disclosure.

As shown in FIG. 9, the network device 500 may include:

a communication unit 510 configured to transmit first Downlink Control Information (DCI) to a terminal device, the first DCI being used by the terminal device to determine a channel access mode corresponding to a first uplink transmission, and the first DCI being used to schedule the first uplink transmission.

In some embodiments of the present disclosure, the communication unit 510 may be further configured to:

transmit first configuration information to the terminal device, the first configuration information being used to configure a Channel Occupancy Time (COT) shared energy detection threshold.

In some embodiments of the present disclosure, the communication unit 510 may be further configured to:

transmit second configuration information to the terminal device, the second configuration information being used to configure first periodic channel occupancy, and the first periodic channel occupancy including channel occupancy for the terminal device to initiate Channel Occupancy Time (COT).

In some embodiments of the present disclosure, the first periodic channel occupancy may be channel occupancy usable by the terminal device to initiate the COT as configured for the terminal device. When the terminal device is a terminal device in an idle state or an inactive state, the first periodic channel occupancy may be configured by the network device via a system message; or when the terminal device is a terminal device in a connected state, the first periodic channel occupancy may be configured by the network device via RRC signaling dedicated to the terminal device.

It should be understood that the device embodiments and the method embodiments may correspond to each other, and for similar descriptions, reference can be made to the method embodiments. In particular, the network device 500 as shown in FIG. 9 may corresponding to the corresponding entity for performing the method 300 according to the embodiment of the present disclosure, and the above and other operations and/or functions of the respective units in the network device 500 are provided for implementing the corresponding processes in the respective methods in FIG. 7. For brevity, details thereof will be omitted here.

The communication device according to the embodiment of the present disclosure has been described above from the perspective of functional modules with reference to the accompanying drawings. It should be understood that the functional modules can be implemented in the form of hardware, software instructions, or a combination of hardware and software modules.

Specifically, the steps of the method embodiments in the embodiments of the present disclosure may be implemented by hardware integrated logic circuits in the processor and/or software instructions, and the steps of the methods disclosed in conjunction with the embodiments of the present disclosure may be directly embodied as implemented by a hardware decoding processor or a combination of hardware and software modules in a decoding processor.

In at least one embodiment, the software modules may be located in a random access memory, a flash memory, a read-only memory, a programmable read-only memory, an electrically erasable programmable memory, a register, and other storage media known in the art. The storage medium is located in the memory, and the processor reads the information in the memory, and performs the steps in the above method embodiments in combination with its hardware.

For example, the processing unit and the communication unit above may be implemented by a processor and a transceiver, respectively.

FIG. 6 is a schematic diagram showing a structure of a communication device 600 according to an embodiment of the present disclosure.

Figures 10, 11:
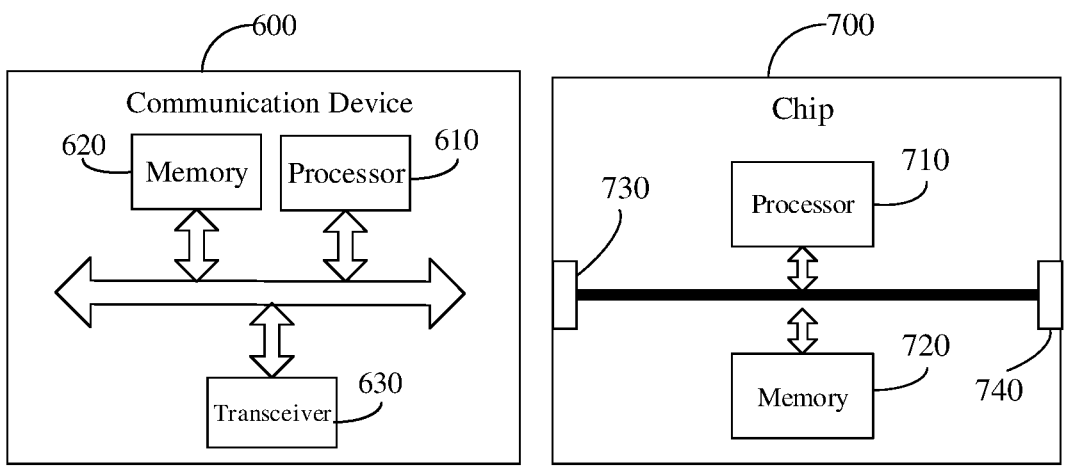
FIG. 10 is a schematic block diagram of a communication device according to an embodiment of the present disclosure.
FIG. 11 is a schematic block diagram of a chip according to an embodiment of the present disclosure.

As shown in FIG. 10, the communication device 600 includes a processor 610.

Here, the processor 610 can invoke and execute a computer program from a memory to implement the method in the embodiment of the present disclosure.

Referring to FIG. 10 again, the communication device 600 may further include a memory 620.

Here, the memory 620 may store indication information, and may further store codes, instructions, etc. to be executed by the processor 610. The processor 610 can invoke and execute a computer program from the memory 620 to implement the method in the embodiment of the present disclosure. The memory 620 may be a separate device independent from the processor 610, or may be integrated in the processor 610.

Referring to FIG. 10 again, the communication device 600 may further include a transceiver 630.

Here, the processor 610 may control the transceiver 630 to communicate with other devices, and in particular, transmit information or data to other devices, or receive information or data transmitted by other devices. The transceiver 630 may include a transmitter and a receiver. The transceiver 630 may further include one or more antennas.

It can be appreciated that the components in the communication device 600 may be connected via a bus system. Here, the bus system may include a power bus, a control bus and a status signal bus, in addition to a data bus.

It can be appreciated that the communication device 600 may be the terminal device according to the embodiment of the present disclosure, and the communication device 600 may implement the corresponding processes implemented by the terminal device in any of the methods according to the embodiments of the present disclosure. That is, the communication device 600 in the embodiment of the present disclosure may correspond to the terminal device 400 in the embodiment of the present disclosure, and may correspond to the corresponding entity that performs the method 200 according to the embodiment of the present disclosure. For the sake of brevity, details thereof will be omitted here. Similarly, the communication device 600 may be the network device according to the embodiment of the present disclosure, and the communication device 600 may implement the corresponding processes implemented by the network device in any of the methods according to the embodiments of the present disclosure. That is, the communication device 600 in the embodiment of the present disclosure may correspond to the network device 500 in the embodiment of the present disclosure, and may correspond to the corresponding entity that performs the method 300 according to the embodiment of the present disclosure. For the sake of brevity, details thereof will be omitted here.

In addition, an embodiment of the present disclosure also provides a chip.

For example, the chip may be an integrated circuit chip, which has a signal processing capability, and can implement or perform any of the methods, steps, and logic block diagrams disclosed in the embodiments of the present disclosure. The chip may also be referred to as a system level chip, a system chip, a chip system, a system-on-a-chip, or the like. In at least one embodiment, the chip can be applied in various communication devices, such that the communication device installed with the chip can perform the methods, steps and logic block diagrams disclosed in the embodiments of the present disclosure.

FIG. 11 is a schematic diagram showing a structure of a chip 700 according to an embodiment of the present disclosure.

As shown in FIG. 11, the chip 700 includes a processor 710.

Here, the processor 710 can invoke and execute a computer program from a memory to implement the method in the embodiment of the present disclosure.

Referring to FIG. 11 again, the chip 700 may further include a memory 720.

Here, the processor 710 can invoke and execute a computer program from the memory 720 to implement the method in the embodiment of the present disclosure. The memory 720 may store indication information, and may further store codes, instructions, etc. to be executed by the processor 710. The memory 720 may be a separate device independent from the processor 710, or may be integrated in the processor 710.

Referring to FIG. 11 again, the chip 700 may further include an input interface 730.

Here, the processor 710 can control the input interface 730 to communicate with other devices or chips, and in particular, obtain information or data transmitted by other devices or chips.

Referring to FIG. 11 again, the chip 700 may further include an output interface 740.

Here, the processor 710 can control the output interface 740 to communicate with other devices or chips, and in particular, output information or data to other devices or chips.

It can be appreciated that the chip 700 may be applied in the network device according to the embodiment of the present disclosure, and the chip may implement the corresponding processes implemented by the network device in any of the methods according to the embodiments of the present disclosure, or the corresponding processes implemented by the terminal device in any of the methods according to the embodiments of the present disclosure. For the sake of brevity, details thereof will be omitted here.

It can be appreciated that the components in the chip 700 may be connected via a bus system. Here, the bus system may include a power bus, a control bus and a status signal bus, in addition to a data bus.

The above processor may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component.

The methods, steps, and logical block diagrams disclosed in the embodiments of the present disclosure can be implemented or performed by the processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The above memory may include, but not limited to, a volatile memory and/or a non-volatile memory. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM).

It is to be noted that the memory used for the system and method described in the present disclosure is intended to include these and any other suitable types of memories.

An embodiment of the present disclosure also provides a computer readable storage medium storing a computer program. The computer readable storage medium stores one or more programs including instructions which, when executed by a portable electronic device including a plurality of application programs, cause the portable electronic device to perform the method according to any of the method embodiments.

In at least one embodiment, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including a computer program.

In at least one embodiment, the computer program product can be applied to the network device in the embodiment of the present disclosure, and the computer program can cause a computer to perform corresponding procedures implemented by the network device in the method according to any of the embodiments of the present disclosure. Details thereof will be omitted here for simplicity.

In at least one embodiment, the computer program product can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program which, when executed by a computer, causes the computer to perform the method according to any of the method embodiments.

In at least one embodiment, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

In at least one embodiment, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

In addition, an embodiment of the present disclosure further provides a communication system, which may include the above terminal device and network device. Details thereof will be omitted here for simplicity. It should be noted that the term "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure.

For example, as used in the embodiments of the present disclosure and the claims as attached, the singular forms "a," "the," "above," and "said" are intended to include the plural forms as well, unless the context clearly indicates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways.

For example, the divisions of the units or modules or components in the apparatus embodiments as described above are only divisions based on logical functions, and there may be other divisions in actual implementations. For example, more than one unit or module or component may be combined or integrated into another system, or some units or modules or components can be ignored or omitted.

In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure.

Finally, it is to be noted that the mutual coupling or direct coupling or communicative connection as shown or discussed above may be indirect coupling or communicative connection between devices or units via some interfaces which may be electrical, mechanical, or in any other forms.

While the specific embodiments of the present disclosure have been described above, the scope of the embodiments of the present disclosure is not limited to these embodiments. Various variants and alternatives can be made by those skilled in the art without departing from the scope of the embodiments of the present disclosure. These variants and alternatives are to be encompassed by the scope of the embodiments of present disclosure as defined by the claims as attached.

What is claimed is:

1. A wireless communication method, comprising:
    determining, by a terminal device, first periodic channel occupancy, the first periodic channel occupancy comprising channel occupancy for the terminal device to initiate Channel Occupancy Time (COT), and the first periodic channel occupancy comprising first channel occupancy; and
    determining, by the terminal device, a channel access mode corresponding to a first uplink transmission, a start position of the first channel occupancy being same as a start position of a first time domain resource, and the first time domain resource being a resource used by the terminal device for transmitting the first uplink transmission,
    wherein the channel access mode corresponding to the first uplink transmission comprises a first channel access mode and/or a second channel access mode,
    wherein the first channel access mode comprises a channel access mode which is used to initiate a COT by the terminal device,
    wherein the second channel access mode comprises a channel access mode which is used to share a COT of a network device,
    wherein said determining, by the terminal device, the channel access mode corresponding to the first uplink transmission comprises:
    determining, by the terminal device, the channel access mode corresponding to the first uplink transmission according to a predetermined rule,
    wherein said determining, by the terminal device, the channel access mode corresponding to the first uplink transmission according to the predetermined rule comprises at least one of:
    determining, by the terminal device, that the channel access mode corresponding to the first uplink transmission is the second channel access mode when the first time domain resource is within a second COT of a network device and the terminal device receives a downlink signal or downlink channel transmitted by the network device before the first time domain resource within the second COT;
    determining, by the terminal device, that the channel access mode corresponding to the first uplink transmission is the first channel access mode when the first time domain resource is within the second COT and the terminal device receives no downlink signal or downlink channel transmitted by the network device before the first time domain resource within the second COT; or
    determining, by the terminal device, that the channel access mode corresponding to the first uplink transmission is the first channel access mode when the first time domain resource is not within COT of the network device.

2. The method according to claim 1, wherein the first channel access mode comprises performing channel sensing with a fixed detection time slot length; or
    the first channel access mode comprises: the terminal device performing channel sensing with a fixed detection time slot length of 9 microseconds before the first time domain resource, and when the channel sensing succeeds, the terminal device transmitting the first uplink transmission over the first time domain resource, or when the channel sensing fails, the terminal device not transmitting the first uplink transmission over the first time domain resource.

3. The method according to claim 1, wherein the second channel access mode comprises a first channel access sub-mode and/or a second channel access sub-mode, wherein the first channel access sub-mode comprises performing no channel sensing, and the second channel access sub-mode comprises performing channel sensing with a fixed detection time slot length within a fixed interval.

4. The method according to claim 1, further comprising:
  determining, by the terminal device, a Cyclic Prefix Extension (CPE) length used by the terminal device for transmitting the first uplink transmission, according to the channel access mode corresponding to the first uplink transmission.

5. The method according to claim 4, wherein said determining, by the terminal device, the CPE length used by the terminal device for transmitting the first uplink transmission, according to the channel access mode corresponding to the first uplink transmission, comprises:
  determining, by the terminal device, that the CPE length used by the terminal device for transmitting the first uplink transmission is 0 when the channel access mode corresponding to the first uplink transmission is the first channel access mode.

6. The method according to claim 4, wherein said determining, by the terminal device, the CPE length used by the terminal device for transmitting the first uplink transmission, according to the channel access mode corresponding to the first uplink transmission, comprises:
  when the channel access mode corresponding to the first uplink transmission is the first channel access mode:
    ignoring, by the terminal device, a CPE length indicated by channel access indication information in first DCI used for scheduling the first uplink transmission; or expecting, by the terminal device, the CPE length indicated by the channel access indication information in the first DCI to be 0.

7. The method according to claim 1, wherein the first periodic channel occupancy is channel occupancy usable by the terminal device to initiate the COT as configured for the terminal device, wherein when the terminal device is a terminal device in an idle state or an inactive state, the first periodic channel occupancy is configured by a network device via a system message; or
  when the terminal device is a terminal device in a connected state, the first periodic channel occupancy is configured by the network device via RRC signaling dedicated to the terminal device.

8. A terminal device, comprising a processor and a memory, wherein the memory stores a computer program, and the processor is configured to invoke and execute the computer program stored in the memory to:
  determine first periodic channel occupancy, the first periodic channel occupancy comprising channel occupancy for the terminal device to initiate Channel Occupancy Time (COT), and the first periodic channel occupancy comprising first channel occupancy; and
  determine a channel access mode corresponding to a first uplink transmission, a start position of the first channel occupancy being same as a start position of a first time domain resource, and the first time domain resource is a resource used by the terminal device for transmitting the first uplink transmission,
  wherein the channel access mode corresponding to the first uplink transmission comprises a first channel access mode and/or a second channel access mode,
  wherein the first channel access mode comprises a channel access mode which is used to initiate a COT by the terminal device,
  wherein the second channel access mode comprises a channel access mode which is used to share a COT of a network device,
  wherein the processor is configured to invoke and execute the computer program stored in the memory to:
  determine the channel access mode corresponding to the first uplink transmission according to a predetermined rule comprising at least one of:
  determining, by the terminal device, that the channel access mode corresponding to the first uplink transmission is the second channel access mode when the first time domain resource is within a second COT of a network device and the terminal device receives a downlink signal or downlink channel transmitted by the network device before the first time domain resource within the second COT;
  determining, by the terminal device, that the channel access mode corresponding to the first uplink transmission is the first channel access mode when the first time domain resource is within the second COT and the terminal device receives no downlink signal or downlink channel transmitted by the network device before the first time domain resource within the second COT; or
  determining, by the terminal device, that the channel access mode corresponding to the first uplink transmission is the first channel access mode when the first time domain resource is not within COT of the network device.

* * * * *